(12) United States Patent
Nakamura et al.

(10) Patent No.: US 7,545,449 B2
(45) Date of Patent: Jun. 9, 2009

(54) LIQUID CRYSTAL DISPLAY DEVICE HAVING AUXILIARY CAPACITIVE ELECTRODE

(75) Inventors: Yayoi Nakamura, Hino (JP); Hiromitsu Ishii, Mitaka (JP); Shinichi Shimomaki, Akishima (JP); Hitoshi Watanabe, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 494 days.

(21) Appl. No.: 11/410,752

(22) Filed: Apr. 25, 2006

(65) Prior Publication Data

US 2006/0187397 A1    Aug. 24, 2006

Related U.S. Application Data

(62) Division of application No. 10/794,276, filed on Mar. 4, 2004, now abandoned.

(30) Foreign Application Priority Data

Mar. 7, 2003   (JP) ............................... 2003-61440
May 15, 2003  (JP) ............................... 2003-137232

(51) Int. Cl.
   *G02F 1/1343*   (2006.01)
   *G02F 1/1333*   (2006.01)

(52) U.S. Cl. ......................................... 349/39; 349/110

(58) Field of Classification Search ............ 349/38–39, 349/110, 139; 257/59, 72
See application file for complete search history.

(56) References Cited

U.S. PATENT DOCUMENTS

| 5,446,562 | A | * | 8/1995 | Sato ............................. 349/42 |
| 5,821,622 | A | | 10/1998 | Tsuji et al. |
| 6,124,904 | A | | 9/2000 | Sato |
| 6,674,499 | B2 | | 1/2004 | Nakamura |
| 7,361,934 | B2 | * | 4/2008 | Ishii ............................ 257/72 |

FOREIGN PATENT DOCUMENTS

| CN | 1363854 A | 5/2002 |
| JP | 1-156725 A | 6/1989 |
| JP | 03-175430 A | 7/1991 |
| JP | 04-166816 A | 6/1992 |
| JP | 04-265945 A | 9/1992 |
| JP | 05-127195 A | 5/1993 |

(Continued)

*Primary Examiner*—Dung T. Nguyen
(74) *Attorney, Agent, or Firm*—Frishauf, Holtz, Goodman & Chick, P.C.

(57) ABSTRACT

A display device includes a substrate, a plurality of scanning lines formed in parallel with each other on the substrate in one direction, a plurality of data lines formed in parallel with each other on the substrate in orthogonal to the scanning lines, a thin film transistor being formed in the vicinity of each intersection of the scanning lines and the data lines and having a semiconductor thin film, a gate electrode connected to one of the scanning lines, a source electrode, a drain electrode connected to one of the scanning lines; pixel electrodes each connected to the source electrode of the thin film transistor, auxiliary capacitive electrodes each having an overlap region that overlaps with the pixel electrodes and forming an auxiliary capacitance with the pixel electrodes, a first insulating film arranged between the auxiliary capacitive electrodes and the data lines, and a second insulting film arranged between the pixel electrodes and the auxiliary capacitive electrodes.

24 Claims, 24 Drawing Sheets

FOREIGN PATENT DOCUMENTS

| | | |
|---|---|---|
| JP | 05-152625 A | 6/1993 |
| JP | 05-173183 A | 7/1993 |
| JP | 06-317814 A | 11/1994 |
| JP | 07-128685 A | 5/1995 |
| JP | 10-3070 A | 1/1998 |
| JP | 11-142880 A | 5/1999 |
| JP | 11-316392 A | 11/1999 |
| JP | 2000-171825 A | 6/2000 |
| JP | 2002-149089 A | 5/2002 |
| KR | 2002-0037680 A | 5/2002 |

\* cited by examiner

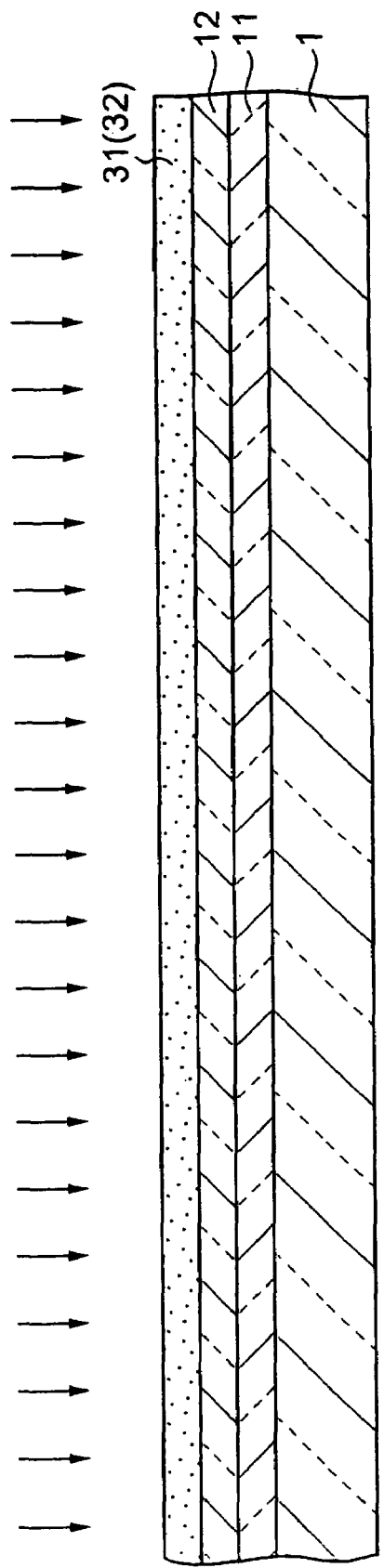

LIQUID CRYSTAL DISPLAY DEVICE HAVING AUXILIARY CAPACITIVE ELECTRODE

This application is a Divisional Application of U.S. Ser. No. 10/794,276, filed Mar. 4, 2004 now abandoned.

BACKGROUND OF THE INVENTION

1. Field of the Invention

The present invention relates to a liquid crystal display device and particularly to a liquid crystal display device having a structure in which display quality is improved by an auxiliary capacitive electrode.

2. Description of the Related Art

For example, in an active matrix type liquid crystal display device, scanning lines and data lines are formed on a glass substrate in a X-direction and a Y-direction, respectively. In the vicinity of each intersection of the scanning lines and the data lines, a thin film transistor connected to both lines is provided as a switching element. An insulating film is formed thereon, and on the insulating film, pixel electrodes are formed to be connected the thin film transistors, which are provided near the intersections, through contact holes provided to the insulating film, respectively. In this case, the edge portion of each pixel electrode is overlapped with both lines in order to obtain a high aperture ratio.

The above-explained liquid crystal display device is disclosed in, for example, FIGS. 1 and 4 of Unexamined Japanese Patent Application KOKAI Publication No. H1-156725.

However, in the above-structured liquid crystal display device, since the edge portion of the pixel electrode is overlapped with the data lines, coupling capacitance occurs on the overlapped portion. For this reason, there is a problem in which vertical crosstalk resulting from the coupling capacitance occurs on the overlapped portion to degrade a display characteristic. In other words, for example, as illustrated in FIG. 24A, in a case where a black square 82 is displayed in one pixel 81 with a gray background, an electrical potential of the pixel 81 is varied as a drain voltage. Accordingly, as illustrated by reference numeral 83 of FIG. 24B, the background color of the upper and lower portions of the square 82 slightly deepens. In this way, the portion colored in black is pulled to the upper and lower sides of the square 82, so that the display characteristic will deteriorate.

In addition, it is assumed that the contents of Unexamined Japanese Patent Application KOKAI Publication No. H1-156725 are incorporated into this specification.

SUMMARY OF THE INVENTION

Accordingly, an object of the present invention is to provide a liquid crystal display device capable of preventing occurrence of vertical crosstalk.

A display device of the present invention includes a substrate. The display device of the present invention further includes a plurality of scanning lines formed in parallel with each other on the substrate in one direction and a plurality of data lines formed in parallel with each other on the substrate in orthogonal to the scanning lines. The display device of the present invention further includes a thin film transistor being formed in the vicinity of each intersection of that scanning lines and that data lines and having a semiconductor thin film, a gate electrode connected to one of the scanning lines, a source electrode, a drain electrode connected to one of the scanning lines. The display device of the present invention further includes pixel electrodes each connected to the source electrode of that thin film transistor. The display device of the present invention further includes auxiliary capacitive electrodes each having an overlap region that overlaps with the pixel electrodes and forming an auxiliary capacitance with the pixel electrodes. The display device of the present invention further includes a first insulating film arranged between that auxiliary capacitive electrodes and that data lines. The display device of the present invention further includes a second insulting film arranged between that pixel electrodes and that auxiliary capacitive electrodes.

BRIEF DESCRIPTION OF THE DRAWINGS

These objects and other objects and advantages of the present invention will become more apparent upon reading of the following detailed description and the accompanying drawings in which:

FIG. 4 is a cross-sectional view of an initial process at the time of manufacturing a thin film transistor panel illustrated in FIGS. 1 and 2;

DETAILED DESCRIPTION OF THE PREFERRED EMBODIMENTS

First Embodiment

Figure 1:
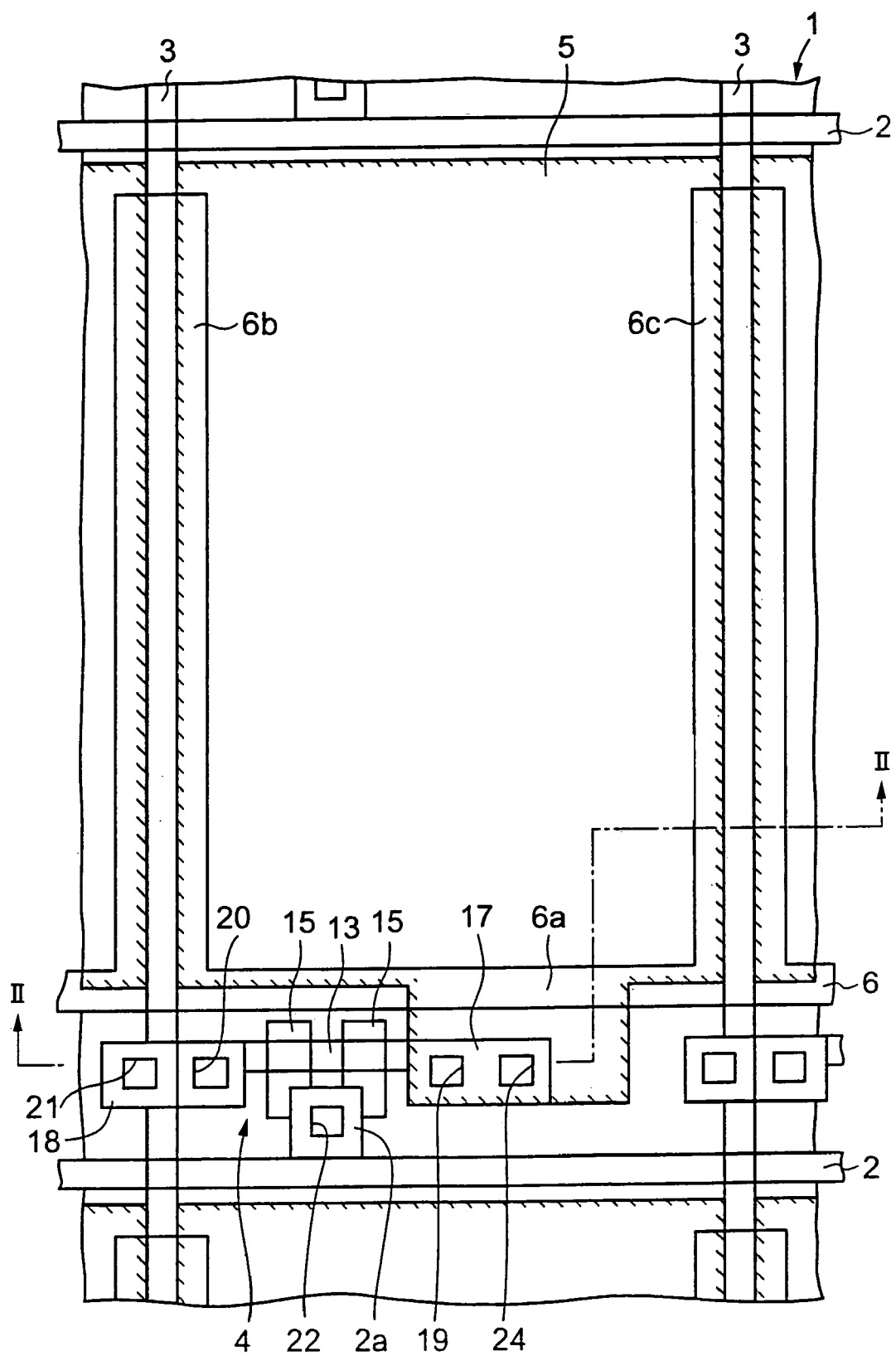
FIG. 1 is a plan view of a main part of a thin film transistor panel in a liquid crystal display device shown as respective layers being seen through according to a first embodiment of the present invention.

FIG. 1 is a plan view of a main part of a thin film transistor panel in a liquid crystal display device shown as respective layers being seen through according to a first embodiment of the present invention. The thin film transistor panel includes a glass substrate 1. On an upper surface side of the glass substrate 1, a plurality of scanning lines 2 are formed in parallel with each other in a horizontal direction and a plurality of data lines 3 are formed in parallel with each other in a vertical direction, orthogonal to the scanning lines 2. In the vicinity of each intersection of scanning lines 2 and data lines 3, a thin film transistor 4 having a double gate structure, a pixel electrode 5, and an auxiliary capacitive electrode 6 are formed. Here, for the purpose of clarifying FIG. 1, an edge portion of each pixel electrode 5 is hatched with oblique short solid lines.

In this case, the right and left edges of the pixel electrode 5 are arranged at the same position as the edges of the data lines 3 arranged at right and left sides of the pixel electrode 5 as seen from the plane, respectively. However, the right and left edges of the pixel electrode 5 may be arranged to overlap with the data lines 3. Accordingly, a region, which is obtained by removing forming regions of the data lines 3 provided at the right and left sides of the pixel electrode 5 and a forming region of the thin film transistor 4 from a forming region of the pixel electrode 5, is used as a substantial pixel region. This makes it possible to obtain a high aperture ratio.

However, in this case, in order to prevent external light from being incident on the thin film transistors 4, a black mask is formed on a portion, which corresponds to at least each of the thin film transistors 4, of a counter panel (not shown) provided to be opposite to the thin film transistor panel.

Each auxiliary capacitive electrode 6 includes a linear electrode portion 6a placed in parallel with the scanning line 2, a strip electrode portion 6b placed in parallel with the left data line 3 of the pixel electrode 5, and a strip electrode portion 6c placed in parallel with the right data line 3 of the pixel electrode 5. In this case, the electrode portion 6a is overlapped with a lower side portion of the pixel electrode 5. Each of the electrode portions 6b and 6c is overlapped with the opposing side portions of the pixel electrodes 5, which are adjacent to each right and left, and the data line 3 formed therebetween.

Moreover, though this is explained later, each of the electrode portions 6b and 6c is placed between the pixel electrodes 5 and the data line 3 in a thickness direction of the thin film transistor panel, namely, a vertical direction on paper of FIG. 1. The width of each of the electrodes 6b and 6c (a length in a direction parallel to the scanning line 2) is set to be wider than the width of the data line 3 to some degree. Accordingly, the data line 3 is entirely covered with the electrode portion 6b or 6c, not to oppose to the pixel electrodes 5 directly, even if there is a positional shift in a direction parallel to the scanning line 2 in an alignment step.

Figure 2:
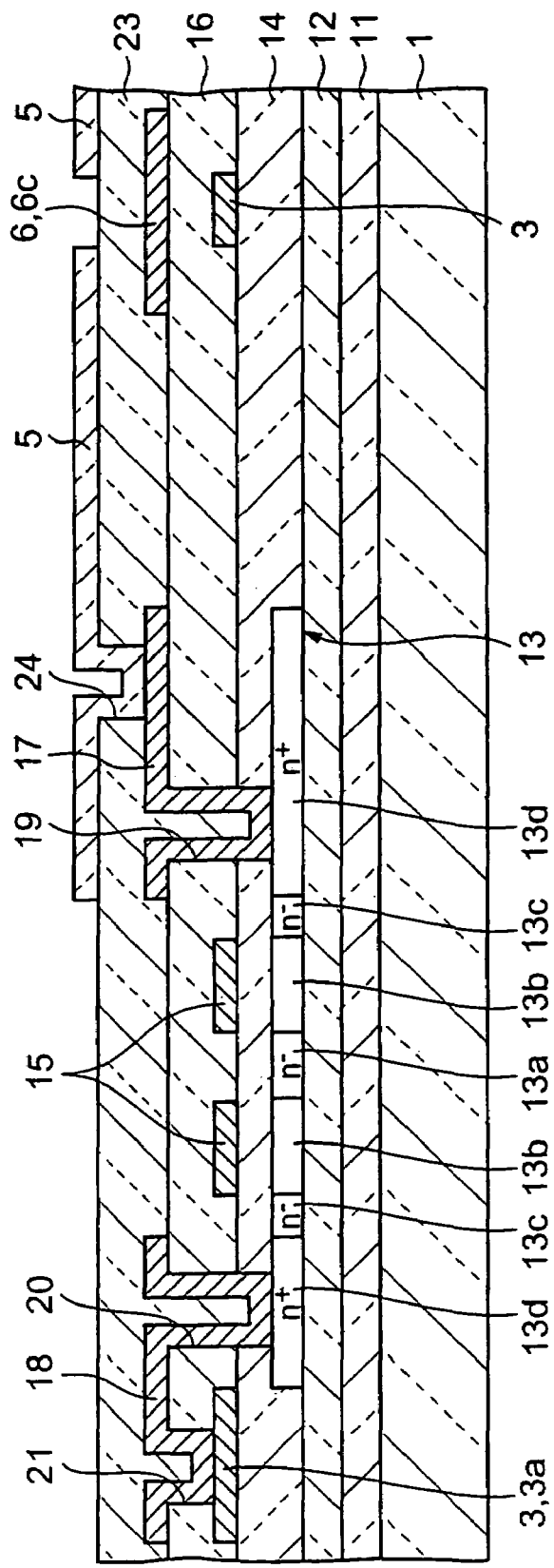
FIG. 2 is a cross-sectional view taken on the line II-II of FIG. 1.
Figure 3A:
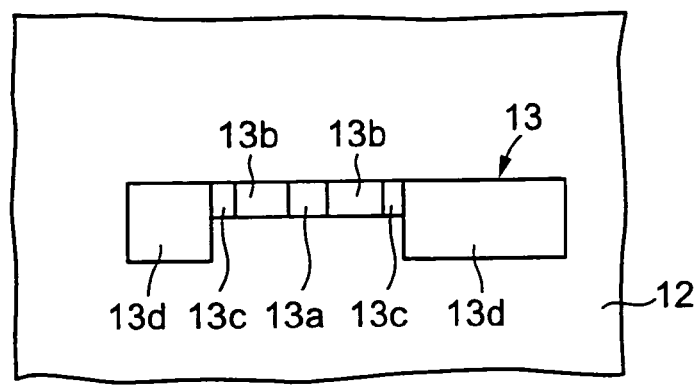
FIGS. 3A to 3C are plan views each explaining a thin film transistor portion illustrated in FIG. 1.

Next, a specific structure of the thin film transistor panel in one pixel will be explained. FIG. 2 is a cross-sectional view taken on the line II-II of FIG. 1. On the upper surface of the glass substrate 1, first and second underlying insulating films 11 and 12 are formed. A polysilicone thin film 13 is formed on a predetermined portion of an upper surface of the second underlying insulating film 12. As illustrated in FIG. 3A, the polysilicone thin film 13 including multiple gate (channel) regions is substantially linearly formed. At a substantially central portion of the polysilicone thin film 13, an n-type impurity low concentration region 13a having a low concentration of n-type impurities is formed. Furthermore, channel regions 13b each having an intrinsic region are formed at both sides of the n-type impurity low concentration region 13a. Moreover, n-type impurity low concentration regions 13c are formed at both sides of the channel regions 13b that sandwich the n-type impurity low concentration region 13a. Furthermore, n-type impurity high concentration regions 13d each having a high concentration of n-type impurities are formed at both sides of channel regions 13c that sandwich the n-type impurity low concentration region 13a and the channel regions 13b.

Figure 3B:
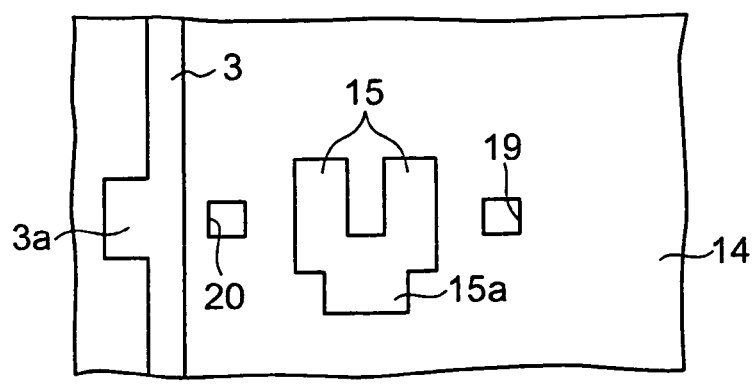

On the upper surfaces of the second underlying insulating film 12 and the polysilicone thin film 13, a gate insulating film 14 is formed. Two gate electrodes 15 are formed on predetermined portions of the upper surface of the gate insulting film 14, so as to cover two channel regions 13b of the polysilicone thin film 13 as illustrated in FIG. 3B. In this case, two gate electrodes 15 have a common connecting portion 15a that connects both electrodes 15 to each other to form a substantially U-shape island. The island means an area that is physically and electrically separated from the other elements, and is used based on the same definition in the explanation hereinafter. On a predetermined portion of the upper surface of the gate insulating film 14, the data line 3 is formed as illustrated in FIG. 3B. A connecting portion 3a with a large width is formed on a predetermined portion of the data line 3.

Figure 3C:
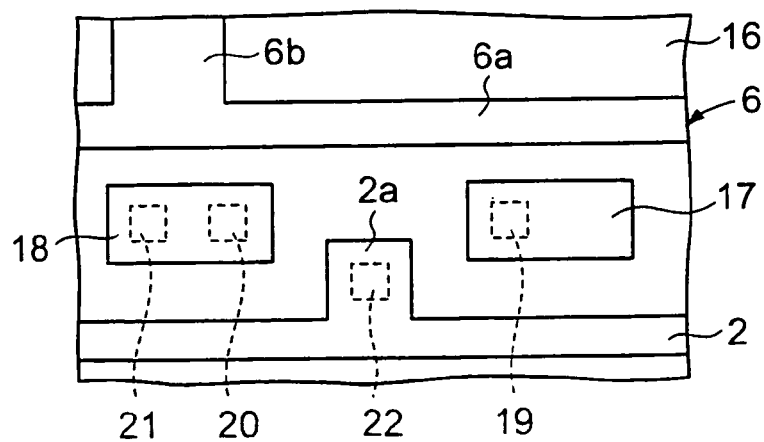

On the upper surfaces of the gate insulating film 14, the gate electrodes 15 and the data line 3, an interlayer insulating film 16 is formed. As illustrated in FIG 3C, a source electrode 17 and a drain electrode 18 are formed in an island shape. The source electrode 17 is connected to one n-type impurity high concentration region 13d of the polysilicone thin film 13 through a contact hole 19 provided to the interlayer insulating film 16 and the gate insulating film 14.

One end of the drain electrode 18 is connected to the other n-type impurity high concentration region 13d of the polysilicone thin film 13 through a contact hole 20 provided to the interlayer insulating film 16 and the gate insulating film 14. The other end of the drain electrode 18 is connected to the connecting portion 3a of the data line 3 through a contact hole 21 provided to the interlayer insulating film 16.

As illustrated in FIG. 3C, the scanning line 2 is formed on a predetermined portion of the upper surface of the interlayer insulating film 16. A connecting portion 2a formed on a predetermined portion of the scanning line 2 is connected to the common connecting portion 15a of the gate electrodes 15 through a contact hole 22 provided to the interlayer insulating film 16. As illustrated in FIGS. 2 and 3C, the auxiliary capacitive electrode 6 is formed on a predetermined portion of the upper surface of the interlayer insulating film 16. In this case, electrode portions 6b and 6c of the auxiliary capacitive electrode 6 are formed on the interlayer insulating film 16, so as to cover the data lines 3.

On the upper surfaces of the interlayer insulating film 16, the source electrode 17 and the like, an overcoat film 23 is formed. On a predetermined portion of the upper surface of the overcoat film 23, the pixel electrode 5 is formed. The pixel electrode 5 is connected to the source electrode 17 through a contact hole 24 provided to the overcoat film 23.

Two divided gate electrodes 15 formed on the gate insulating film 14 cover the polysilicone thin film 13 to oppose to two channel regions 13b of the polysilicone thin film 13, respectively. In this way, the thin film transistor 4 having the double gate structure is structured by the polysilicone thin film 13, the gate insulating film 14, the gate electrodes 15, the source electrode 17, and the drain electrode 18.

An explanation will be next given of an example of a method for manufacturing the thin film transistor panel having the aforementioned structure. First of all, as illustrated in FIG. 4, on the upper surface of the glass substrate 1, the first underlying insulating film 11 of silicon nitride, the second underlying insulating film 12 of silicon oxide, and an amorphous silicon thin film 31 are continuously formed by a plasma CVD (Chemical Vapor Deposition) method. Next, the amorphous silicon thin film 31 is crystallized by irradiation of excimer lasers to form a polysilicone thin film 32.

Figure 5:
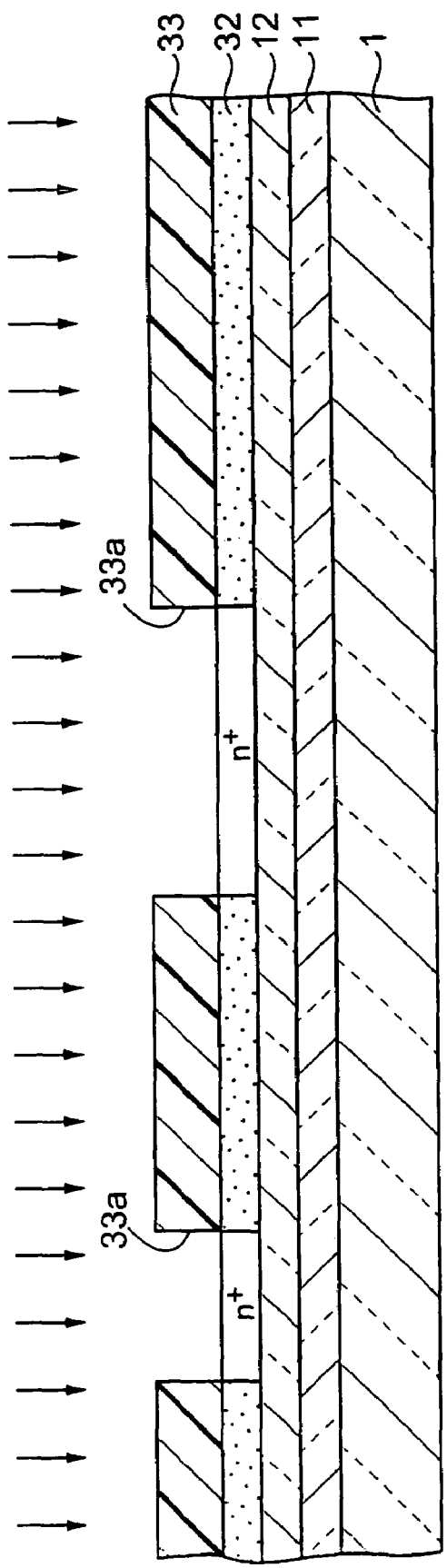
FIG. 5 is a cross-sectional view of a process subsequent to FIG. 4.

Next, as illustrated in FIG. 5, on the upper surface of the polysilicone thin film 32, there is formed resist pattern 33 having openings 33a formed on portions corresponding to the forming regions of the n-type impurity high concentration region 13d as illustrated in FIG. 2. Next, the resist pattern 33 is used as a mask and n-type impurities are injected threreonto with a high concentration. Thereafter, the resist pattern 33 is peeled from the polysilicone thin film 32.

Figure 6:
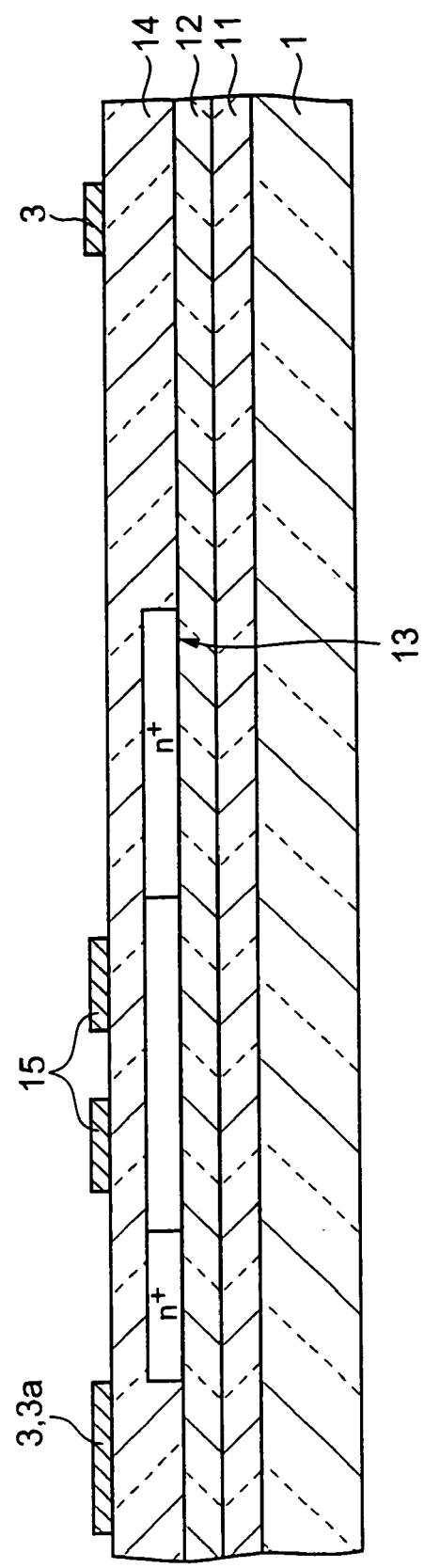
FIG. 6 is a cross-sectional view of a process subsequent to FIG. 5.

Next, the polysilicone thin film 32 is patterned to form the polysilicone thin film 13 on a predetermined portion of the upper surface of the second underlying insulating film 12 as illustrated in FIG. 6. Sequentially, on the upper surfaces of the second underlying insulating film 12 and the polysilicone thin film 13, the gate insulating film 14 of silicon oxide is formed by a plasma CVD method. Next, on the upper surface of the gate insulating film 14, a metallic film of Al and the like is formed by a sputtering method. Then, by patterning the formed metallic film, the gate electrodes 15 having the common connecting portion 15a and the data line 3 having the connecting portion 3a, as illustrated in FIG. 3B, are formed.

Figure 7:
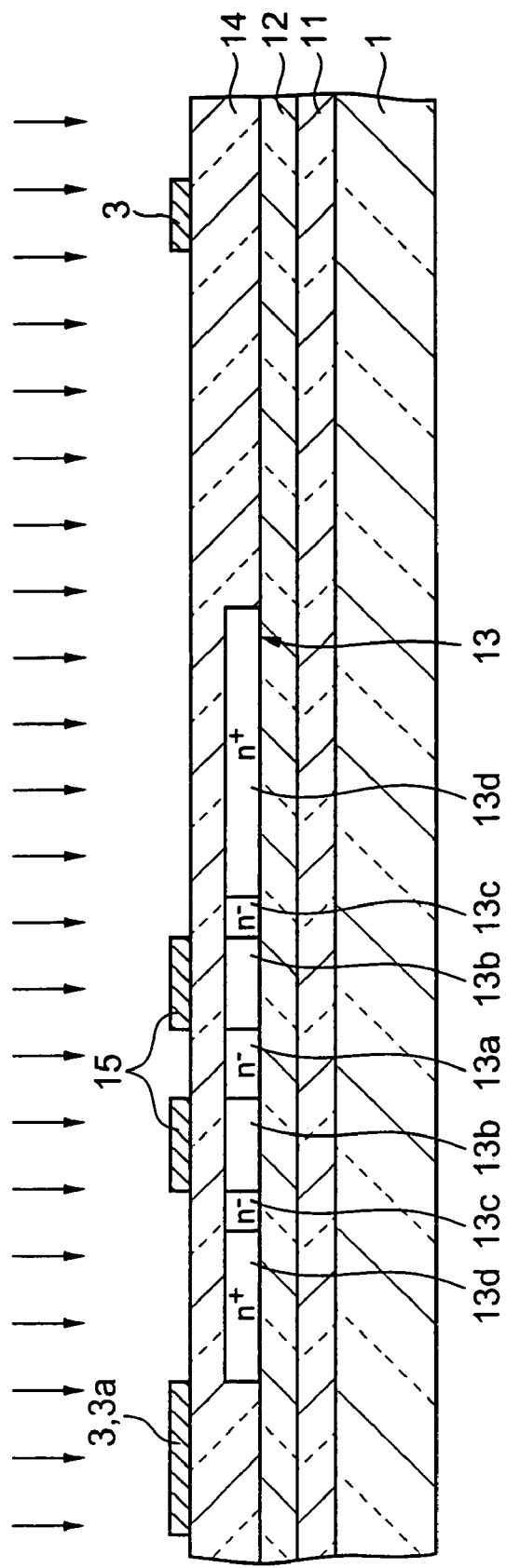
FIG. 7 is a cross-sectional view of a process subsequent to FIG. 6.

Next, as illustrated in FIG. 7, two gate electrodes 15 and the data line 3 are used as a mask and n-type impurities are injected with a low concentration. As a result, the n-type impurity low concentration region 13a is formed on a region of the polysilicone thin film 13, which corresponds to a portion between two gate electrodes 15. Furthermore, channel regions 13b each having an intrinsic region are formed on regions directly below two gate electrodes 15. Moreover, n-type impurity low concentration regions 13c are formed at both sides of the channel regions 13b, and n-type impurity high concentration regions 13d are formed at both sides of the n-type impurity low concentration regions 13c. Next, in a nitrogen gas atmosphere, anneal processing is performed at temperature of about 500° C. for about one hour. As a result, the injected impurities are activated.

Figure 8:
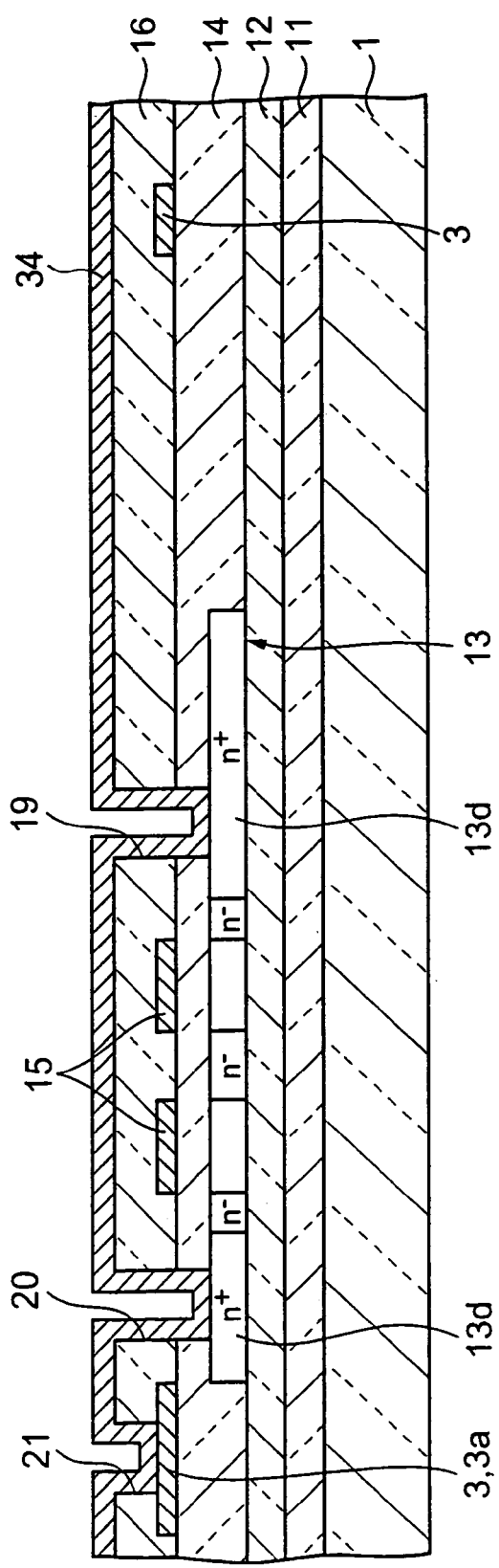
FIG. 8 is a cross-sectional view of a process subsequent to FIG. 7.

As illustrated in FIG. 8, on the upper surfaces of the gate insulating film 14, the gate electrodes 15 and the data line 3, the interlayer insulating film 16 of silicon nitride is formed by a plasma CVD method. Next, openings 19 and 20 are formed to the interlayer insulating film 16 and the gate insulating film 14, so as to reach the high n-type impurity concentration regions 13d of the polysilicone thin film 13. Moreover, an opening 21 is formed to the interlayer insulating film 16, so as to reach the connecting portion 3a of the data line 3. Furthermore, as illustrated in FIGS. 3B and 3C, an opening 22 is formed to the interlayer insulating film 16, so as to reach the common connection portion 15a of two gate electrodes 15. Next, an Al film and a Cr film (or Mo film) for ITO contact are successively formed in the openings 19, 20, 21 and 22 and on the upper surface of the interlayer insulating film 16 by a sputtering method. As a result, a metal film 34 is formed.

After that, by patterning the metal film 34, the source electrode 17, the drain electrode 18, the scanning line 2 with the connecting portion 2a, and the auxiliary capacitive electrode 6 are respectively formed on predetermined portions of the upper surface of the interlayer insulating film 16, as illustrated in FIGS. 2 and 3. Under this condition, the source electrode 17 is connected to one n-type impurity high concentration region 13d of the polysilicone thin film 13 through the contact hole 19. Moreover, one end of the drain electrode 18 is connected to the other n-type impurity high concentration region 13d of the polysilicone thin film 13 through the contact hole 20. Furthermore, the other end of the drain electrode 18 is connected to the connecting portion 3a of the data line 3 through the contact hole 21. Also, the connecting portion 2a of the scanning line 2 is connected to the common connecting portion 15a of two gate electrodes 15 through the contact hole 22.

Next, on the upper surfaces of the interlayer insulating film 16, the source electrode 17 and the like, the overcoat film 23 of silicon nitride is formed by a plasma CVD method. Next, a contact hole 24 is formed on a predetermined portion of the overcoat film 23, so as to reach the source electrode 17. Sequentially, an ITO film is formed on the upper surface of the overcoat film 23 by a sputtering method. Then, the formed ITO film is patterned to form the pixel electrode 5 connected to the source electrode 7 through the contact hole 24. Thus, the thin film transistor panel as illustrated in FIGS. 1 and 2 can be obtained.

In the liquid crystal display device having the above-obtained thin film transistor panel, the electrode portions 6b and 6c of the auxiliary capacitive electrode 6 each having a larger width than that of the data line 3 are formed between the edge portions of the pixel electrodes 5 and the data lines 3. For this reason, the electrode portions 6b and 6c can prevent the coupling capacitance from occurring between the edge portions of the pixel electrodes 5 and the data lines 3. Accordingly, it is possible to prevent occurrence of vertical crosstalk and achieve a high display characteristic.

The aforementioned manufacturing method includes first to fifth processes. The first process forms the data line 3 and the island gate electrodes 15 on the gate insulating film 14. The second process forms the contact holes 19 and 20 through the interlayer insulating film 16 and the gate insulating film 14. The third process forms the scanning line 2, the auxiliary capacitive electrode 6, the island source electrode 17 and the island drain electrode 18 on the interlayer insulating film 16. The fourth process forms the contact hole 24 to the overcoat film 23. The fifth process forms the pixel electrode 5 on the overcoat film 23. While, for example, a manufacturing method for the display device illustrated in FIGS. 1 and 4 of the above-described Unexamined Japanese Patent Application KOKAI Publication No. H1-156725 includes first to fifth processes. The first process forms a scanning line and a gate electrode on a gate insulating film. The second process forms a contact hole passing through an interlayer insulating film and the gate insulating film, so as to reach one source and drain regions. The third process forms a data line on the interlayer insulating film. The fourth process forms a contact hole passing through an overcoat film, the interlayer insulating film and the gate insulating film, so as to reach the other source and drain regions. The fifth process forms a pixel electrode on the overcoat film. Accordingly, even if the gate electrode 15, the source electrode 17 and the drain electrode 18 are formed in an island shape in the above-mentioned manufacturing method, the number of manufacturing processes does not increase.

Second Embodiment

Figure 9:
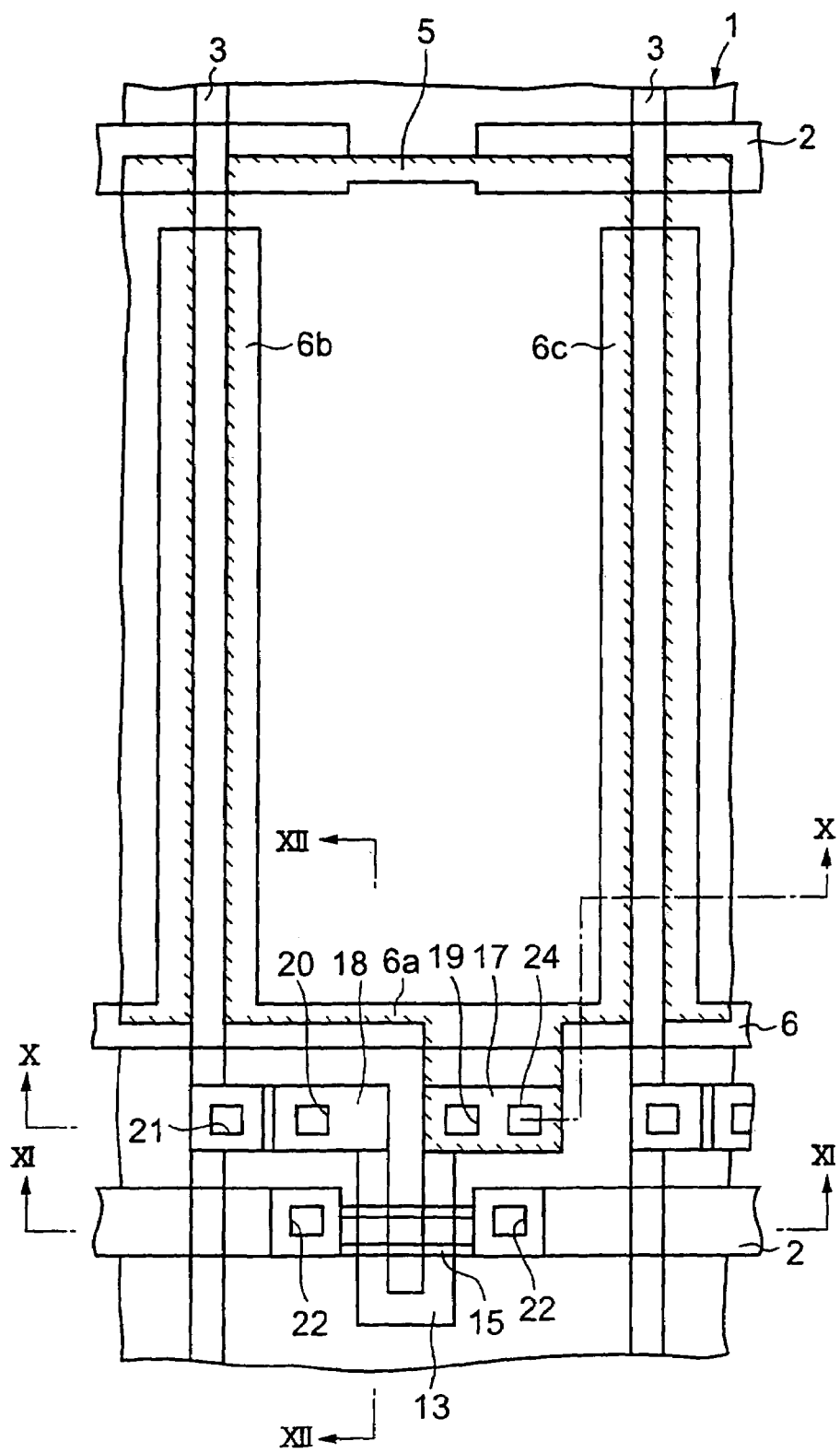
FIG. 9 is a plan view of a main part of a thin film transistor panel in a liquid crystal display device shown as respective layers being seen through according to a second embodiment of the present invention.

FIG. 9 is a plan view of a main part of a thin film transistor panel in a liquid crystal display device shown as respective layers being seen through according to a second embodiment of the present invention. In this case, the edge portion of each pixel electrode 5 is also hatched with oblique short solid lines for the purpose of clarifying FIG. 9. The point, which is largely different from the case shown in FIGS. 1 and 2, relates to a thin film transistor structure having a double gate structure. Though the detailed explanation is set forth below, in each pixel of the thin film transistor panel of the second embodiment, a polysilicone thin film is flat and U-shaped and a gate electrode is linearly formed to bridge the opposing portions of the U-shaped polysilicone thin film. Similar to the first embodiment, the gate electrode and a scanning line are connected to each other through a contact hole formed to an interlayer insulating film. However, in this case, the width of the scanning line can be set to the same or less than the width of the gate electrode. This makes it possible to improve the aperture ratio as compared with the double gate structure where the divided portions of the U-shaped gate electrode projects from the scanning line.

Figure 10:
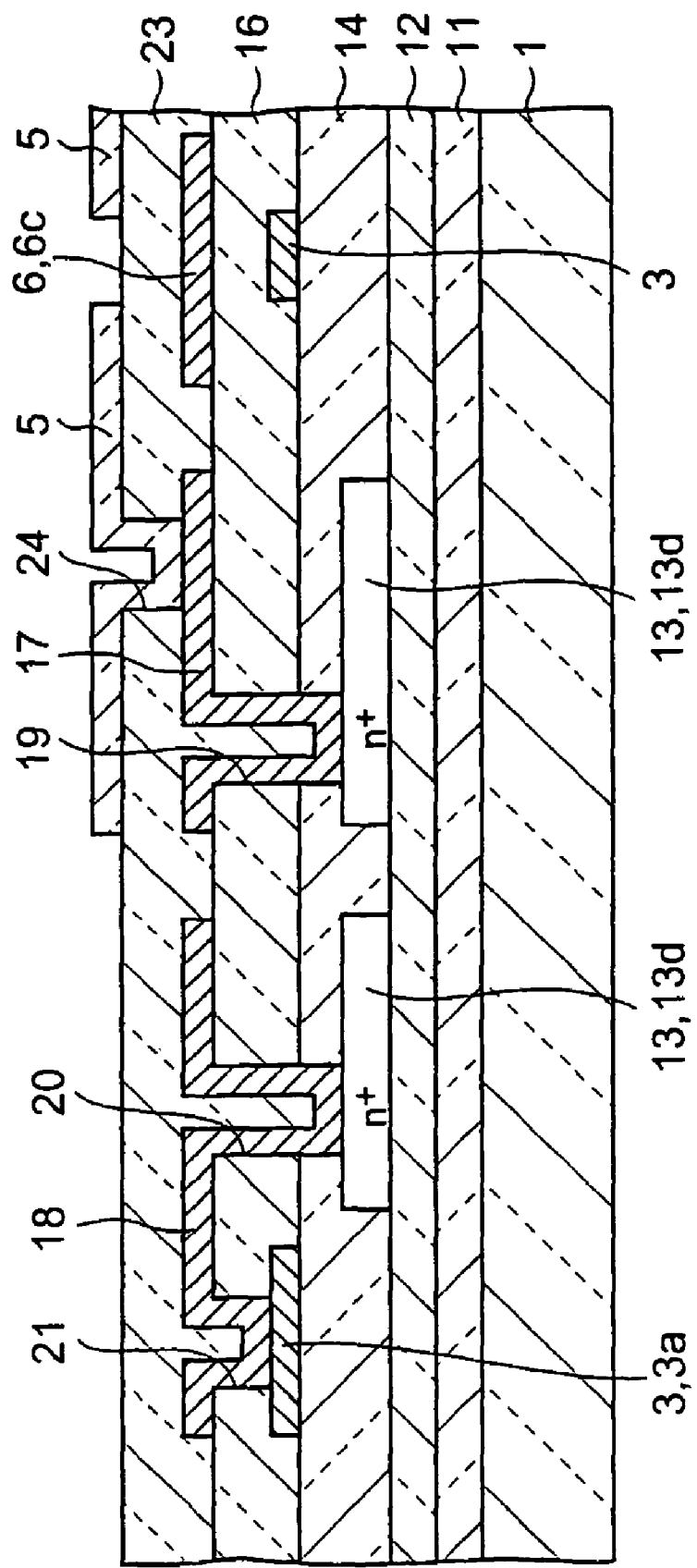
FIG. 10 is a cross-sectional view taken on the line X-X of FIG. 9.
Figure 11:
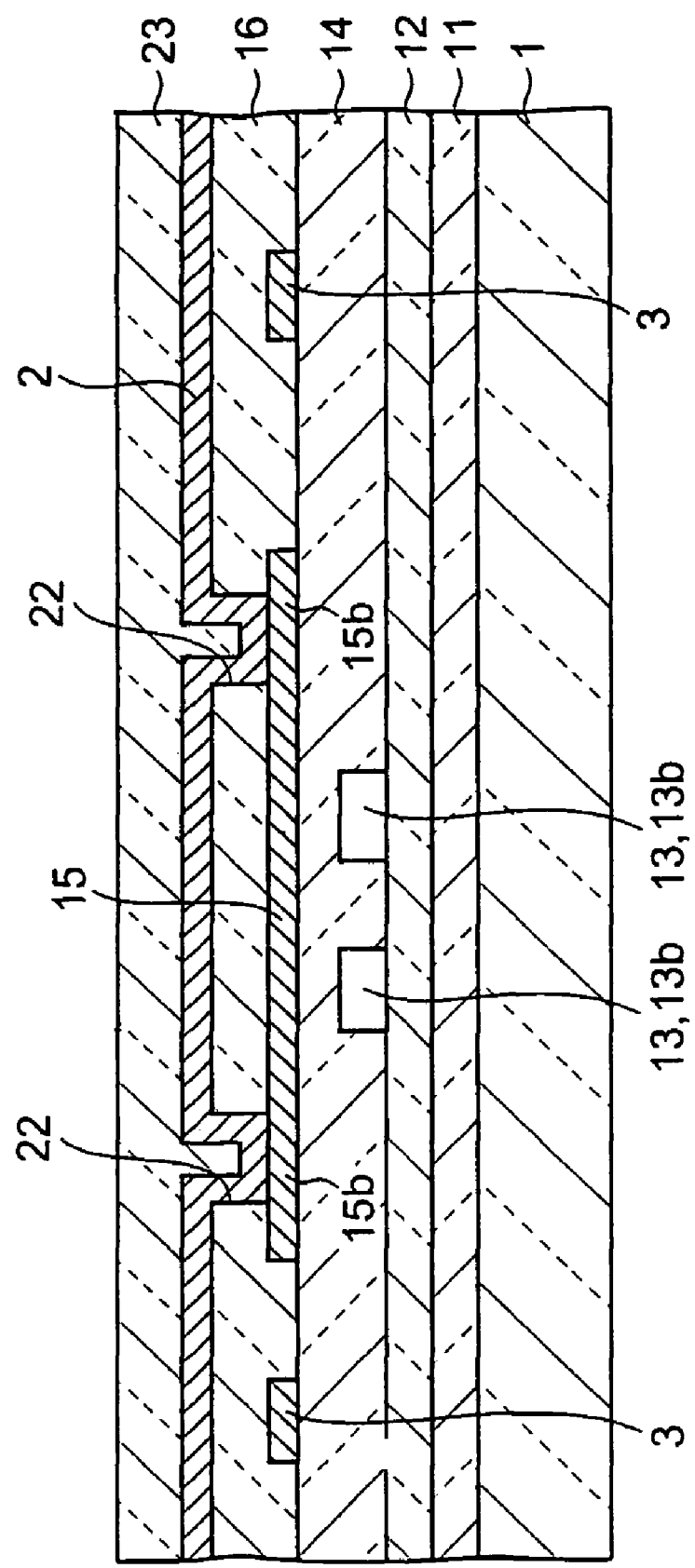
FIG. 11 is a cross-sectional view taken on the line XI-XI of FIG. 9.
Figure 12:
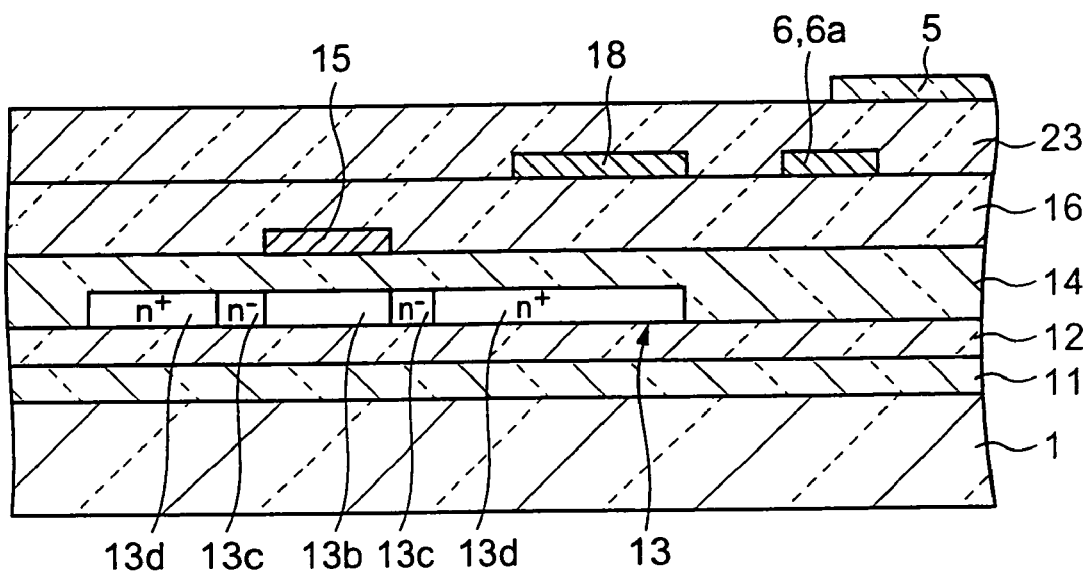
FIG. 12 is a cross-sectional view taken on the line XII-XII of FIG. 9.
Figure 13A:
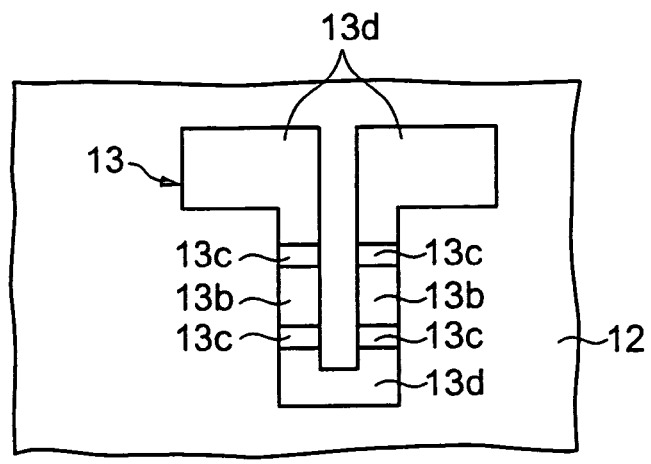
FIGS. 13A to 13C are plan views each explaining a thin film transistor portion illustrated in FIG. 9.

The specific structure of the thin film transistor panel in one pixel will be now explained. FIG. 10 is a cross-sectional view taken on the line X-X of FIG. 9, FIG. 11 is a cross-sectional view taken on the line XI-XI of FIG. 9, and FIG. 12 is a cross sectional view taken on the line XII-XII of FIG. 9. The first and second underlying insulating films 11 and 12 are formed on the upper surface of the glass substrate 1. The polysilicone thin film 13 is formed on a predetermined portion of the upper surface of the second underlying insulating film 12. As illustrated in FIG. 13A, the polysilicone thin film 13 is substantially U-shaped and symmetrical with a vertical center line, and includes multiple gate (channel) regions. At a substantially central portion of each of a pair of side bars, the channel region 13b having an intrinsic region is formed. Moreover, the n-type impurity low concentration regions 13c are formed at both sides of the channel region 13b. Furthermore, the n-type impurity high concentration regions 13d are formed at both sides of the n-type impurity low concentration regions 13c.

Figure 13B:
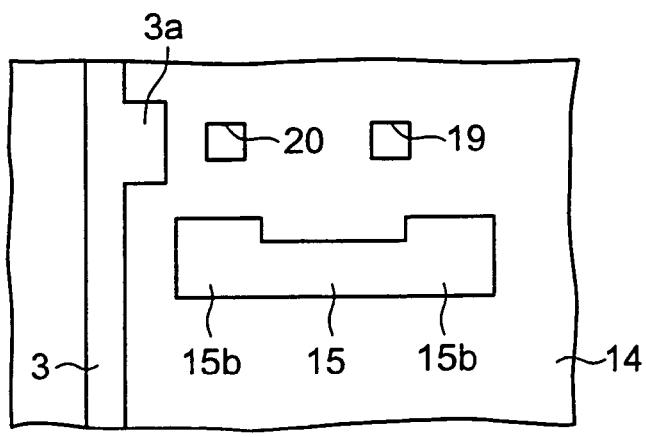

On the upper surfaces of the second underlying insulating film 12 and the polysilicone thin film 13, the gate insulating film 14 is formed. One linear gate electrode 15 is formed in an island shape on a predetermined portion of the upper surface of the gate insulting film 14, so as to cover two channel regions 13b of the polysilicone thin film 13 as illustrated in FIG. 13B. In this case, connecting portions 15b are provided at both ends of the gate electrode 15. On a predetermined portion of the upper surface of the gate insulating film 14, the data line 3 is formed as illustrated in FIG. 13B. The connecting portion 3a with a large width is formed on a predetermined portion of the data line 3.

Figure 13C:
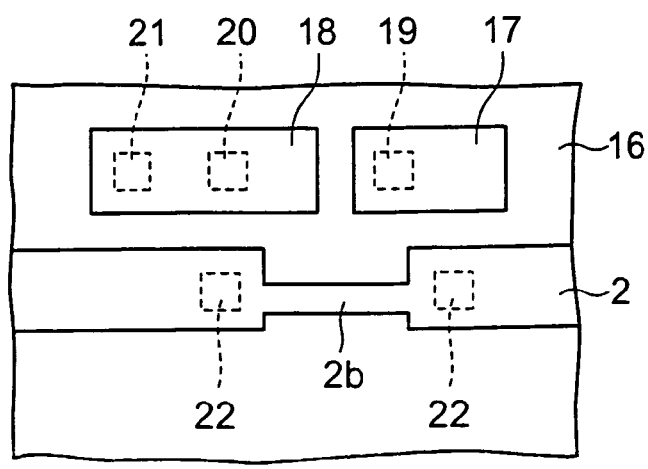

On the upper surfaces of the gate insulating film 14, the gate electrode 15 and the data line 3, the interlayer insulating film 16 is formed. As illustrated in FIG. 13C, the source electrode 17 and the drain electrode 18 are formed on predetermined portions of the upper surface of the interlayer insulating film 16 in an island shape, respectively. The source electrode 17 is connected to one n-type impurity high concentration region 13d of the polysilicone thin film 13 through the contact hole 19 provided to the interlayer insulating film 16 and the gate insulating film 14.

One end of the drain electrode 18 is connected to the other n-type impurity high concentration region 13d of the polysilicone thin film 13 through the contact hole 20 provided to the interlayer insulating film 16 and the gate insulating film 14. The other end of the drain electrode 18 is connected to thee connecting portion 3a of the data line 3 through the contact hole 21 provided to the interlayer insulating film 16.

On a predetermined portion of the upper surface of the interlayer insulating film 16, the scanning line 2 is formed as illustrated in FIG. 13C. In this case, the scanning line 2 has a narrow width portion 2b provided above a portion of the gate electrode 15, which is sandwiched by the connecting portions 15b. The narrow width portion 2b is set to be narrower than the sandwiched portion. This structure is made to surely prevent the scanning line 2 from sticking out of the gate electrode 15 of lower layer in the width direction as seen from the plane, thereby an electric field is surely prevented from acting on the channel region. Both side portions of the narrow width portion 2b of the scanning line 2 are connected to the connecting portions 15b of the gate electrode 15 through the contact holes 22 provided to the interlayer insulating film 16. Accordingly, the narrow width portion 2b of the scanning line 2 may be omitted. On a predetermined portion of the upper surface of the interlayer insulating film 16, substantially the same auxiliary capacitive electrode 6 as the first embodiment is formed.

On the upper surfaces of the interlayer insulating film 16, the source electrode 17 and the like, the overcoat film 23 is formed. On a predetermined portion of the upper surface of the overcoat film 23, the pixel electrode 5 is formed. The pixel electrode 5 is connected to the source electrode 17 through the contact hole 24 provided to the overcoat film 23.

In this way, the thin film transistor 4 having the double gate structure is structured by the polysilicone thin film 13 having two channel regions 13b, the gate insulating film 14, the gate electrode 15, the source electrode 17, and the drain electrode 18.

In addition, the thin film transistor panel manufacturing method of the second embodiment is substantially the same as the first embodiment, and the explanation is omitted. As mentioned above, in the thin film transistor panel of the second embodiment, the linear and island-shaped gate electrode 15 formed on the gate insulating film 14 and the scanning line 2 formed on the interlayer insulating film 16 are overlapped with each other as seen from the plane. This makes it possible to reduce the plane arranging space of the gate electrode 15 in the direction perpendicular to the scanning line 2. As a result, a much higher aperture ratio can be achieved.

Third Embodiment

Figure 14:
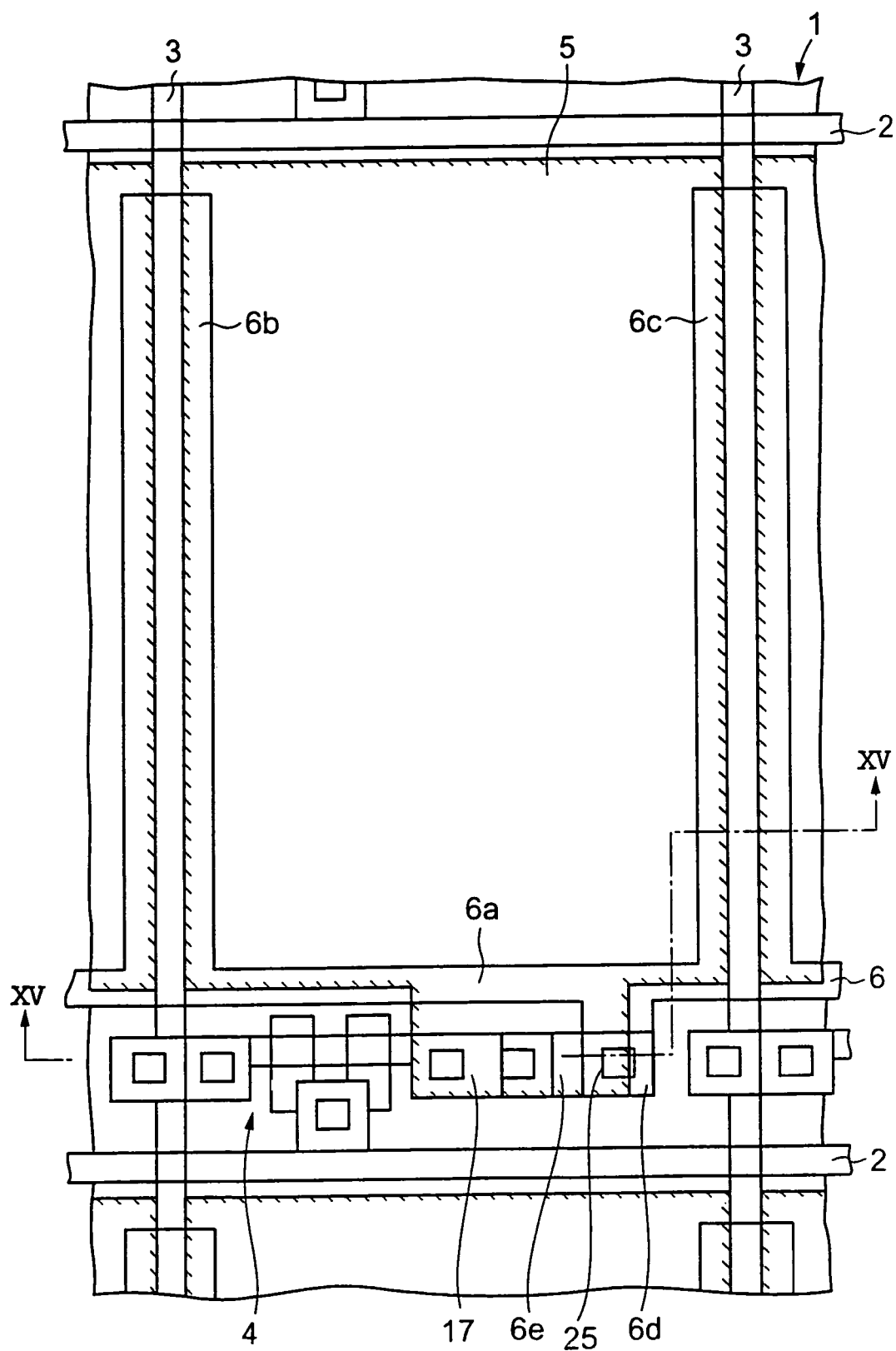
FIG. 14 is a plan view of a main part of a thin film transistor panel in a liquid crystal display device shown as respective layers being seen through according to a third embodiment of the present invention.
Figure 15:
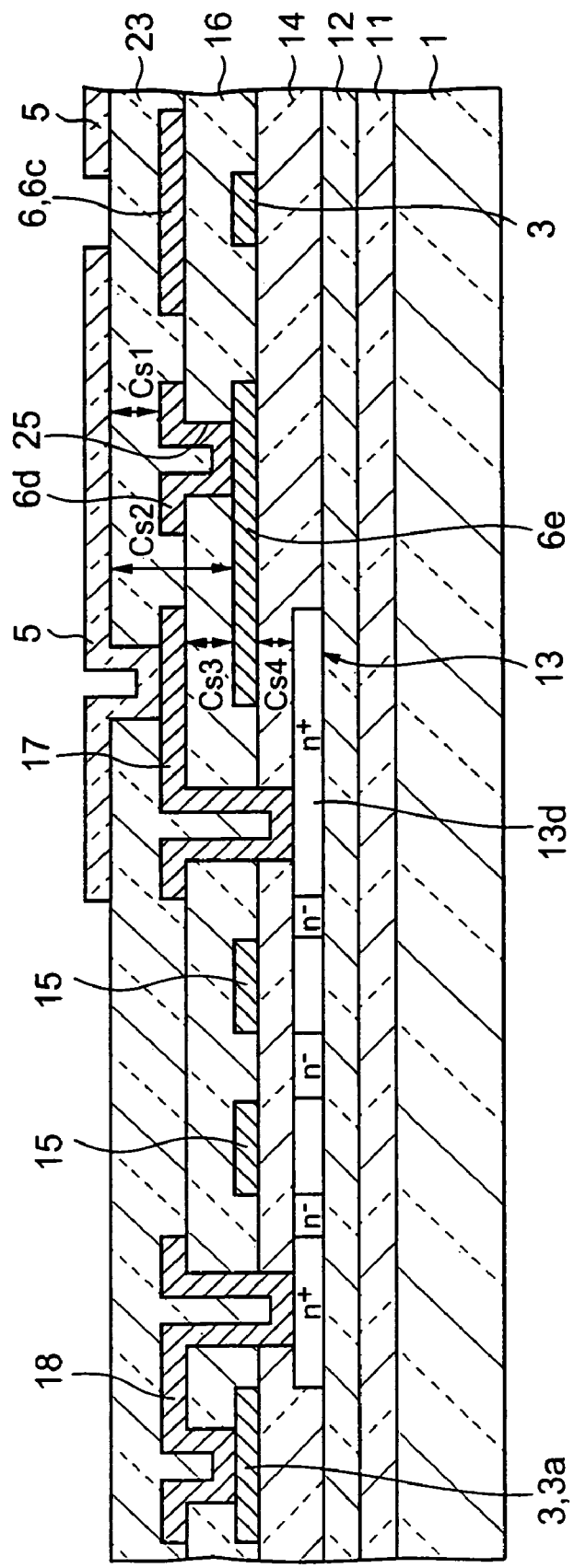
FIG. 15 is a cross-sectional view taken on the line XV-XV of FIG. 14.

In order to increase an auxiliary capacitance that is formed of the auxiliary capacitive electrode 6 and the pixel electrode 5, the following method can be used. Namely, in the process of forming the gate electrode 15 on the gate insulating film 14, an auxiliary capacitive electrode of the lower layer is formed on a region overlapping with the polysilicone thin film 13 and the pixel electrode 5, simultaneously, and the auxiliary capacitive electrode of the lower layer is connected to the auxiliary capacitive electrode 6 of the first and second embodiments. The third embodiment shows a thin film transistor panel in the above-manufactured liquid crystal display device. FIG. 14 is a plan view of a main part of the thin film transistor panel in the liquid crystal display device shown as respective layers being seen through according to the third embodiment of the present invention, and FIG. 15 is a cross-sectional view taken on the line XV-XV of FIG. 14. In this thin film transistor panel, on the interlayer insulating film 16, there is formed an electrode portion 6d drawn from the electrode portion 6a of the auxiliary capacitive electrode 6 in a direction opposite to the drawing directions of electrode portions 6b and 6c, and corresponding to the lower side portion of the pixel electrode 5. Moreover, on a region of the gate insulating film 14, which corresponds to the forming regions of the electrode portion 6d and the source electrode 17, an island electrode portion 6e is formed. The electrode portion 6d is connected to the electrode portion 6e through a contact hole provided to a predetermined portion of the interlayer insulating film 16. The above-described structure is different from the structure shown in FIGS. 1 and 2.

In such a case, as auxiliary capacitances, there are further formed an auxiliary capacitance Cs1 between the electrode portion 6d and the upper pixel electrode 5, an auxiliary capacitance Cs2 between the electrode portion 6e and the upper pixel electrode 5, an auxiliary capacitance Cs3 between the electrode portion 6d and the upper source electrode 17, and an auxiliary capacitance Cs4 between the electrode portion 6e and the lower n-type impurity high concentration region 13d. Accordingly, more auxiliary capacitances can be ensured.

Fourth Embodiment

Figure 16:
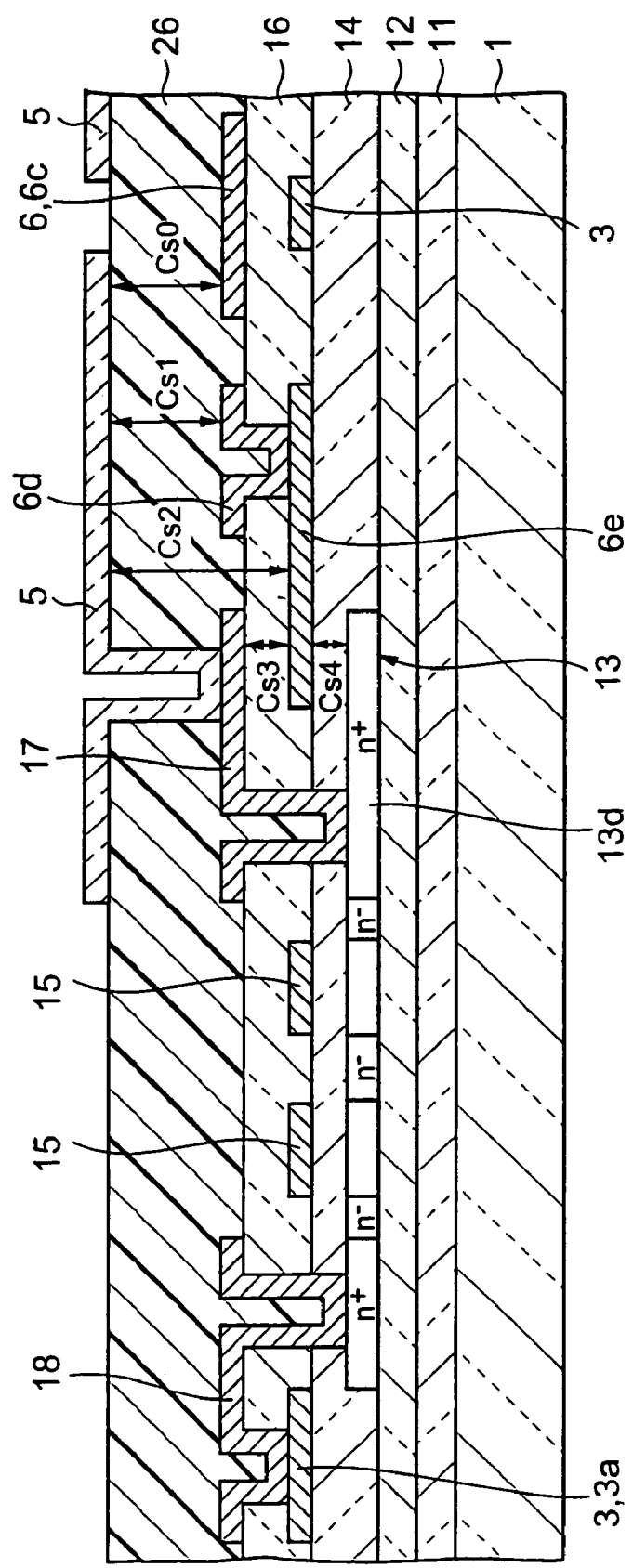
FIG. 16 is a cross-sectional view of a thin film transistor panel in a liquid crystal display device according to a fourth embodiment of the present invention, similar to FIG. 15.

FIG. 16 is a cross-sectional view of a thin film transistor panel in a liquid crystal display device according to a fourth embodiment of the present invention, similar to FIG. 15. In this thin film transistor panel, the point different from the case shown in FIG. 15 is that a relative thicker flatting film 26 formed of polyimide: resin, epoxy resin or the like is used in place of the overcoat film 23 formed of silicon nitride. In this case, since the flatting film 26 is relatively thicker, a normal auxiliary capacitance Cs0 between the auxiliary capacitive electrode 6 and the pixel electrode 5 shown in FIG. 1 becomes small. However, since the auxiliary capacitances Cs1, Cs2, Cs3, and Cs4 are formed in addition to this as mentioned above, necessary auxiliary capacitance can be fully ensured.

Fifth Embodiment

Figure 17:
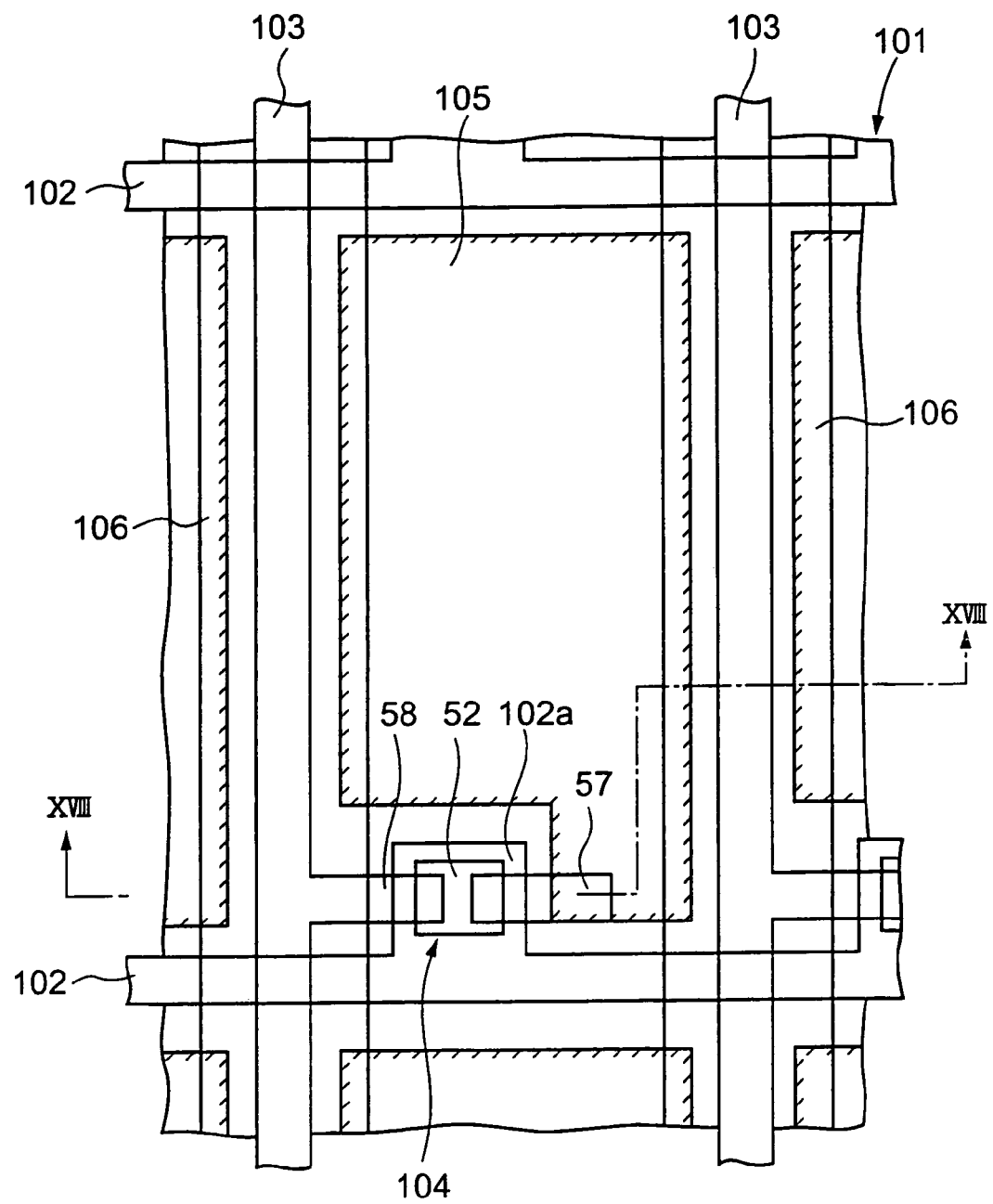
FIG. 17 is a plan view of a thin film transistor panel in an active matrix type liquid crystal display device shown as respective layers being seen through according to a fifth embodiment of the present invention.

First to fourth embodiments showed the top gate type thin film transistor. However, the present invention can be applied to a bottom gate type thin film transistor. Moreover, if the auxiliary capacitive electrode is formed on only the portion overlapping with the data line, a much higher aperture ratio can be achieved. Fifth embodiment shows a thin film transistor panel in such an active matrix type liquid crystal display device. FIG. 17 is a plan view of the thin film transistor panel shown as respective layers being seen through. This thin film transistor panel includes a glass substrate 101. On the upper surface side of the glass substrate 101, scanning lines 102 and data lines 103 are formed in such a manner as the manner set forth in the first embodiment. Then, in the vicinity of each intersection of scanning lines 102 and data lines 103, a thin film transistor 104 and a pixel electrode 105 are formed. Moreover, auxiliary capacitive electrodes 106 are formed to be parallel with the data lines 103, respectively.

In this case, right and left side portions of the pixel electrode 105 are overlapped with the auxiliary capacitive electrodes 106 arranged at the right and left sides of the pixel electrode 105. Accordingly, a region, which is obtained by removing forming regions of the auxiliary capacitive electrodes 106 arranged at the right and left sides of the pixel electrode. 105 and a forming region of the thin film transistor 104 from a forming region of the pixel electrode 105, is used as a substantial pixel region. However, in order to prevent external light from being incident on the thin film transistors 104, black masks are formed on portions, which correspond to at least the thin film transistors 104, of a counter panel (not shown) provided to be opposite to the thin film transistor panel.

Each auxiliary capacitive electrode 106 is overlapped with the data line 103. Moreover, though this is explained later, each of the auxiliary capacitive electrodes 106 is formed between the data line 103 and the pixel electrodes 105 in a thickness direction of the thin film transistor panel, namely, a vertical direction on paper of FIG. 17. Then, the width of each auxiliary capacitive electrode 106 (a length in a direction parallel to the scanning line 102) is set to be wider than the width of the data line 103. Accordingly, the data line 3 is entirely covered with the auxiliary capacitive electrode 106 not to oppose to the pixel electrodes 105 directly even if there is a positional shift in a direction parallel to the scanning line 102.

Moreover, each auxiliary capacitive electrode 106 is formed over almost the entire area of the arranging region of the data line 103. Thereby, even if the position of the auxiliary capacitive electrode 106 is shifted to the pixel electrode 105 in a direction perpendicular to the scanning line 102 in an alignment step, the auxiliary capacitive electrode 106 is overlapped with the pixel electrode 105 without fail. Accordingly, variations in the auxiliary capacitance caused by the positional shift are surely prevented.

Figure 18:
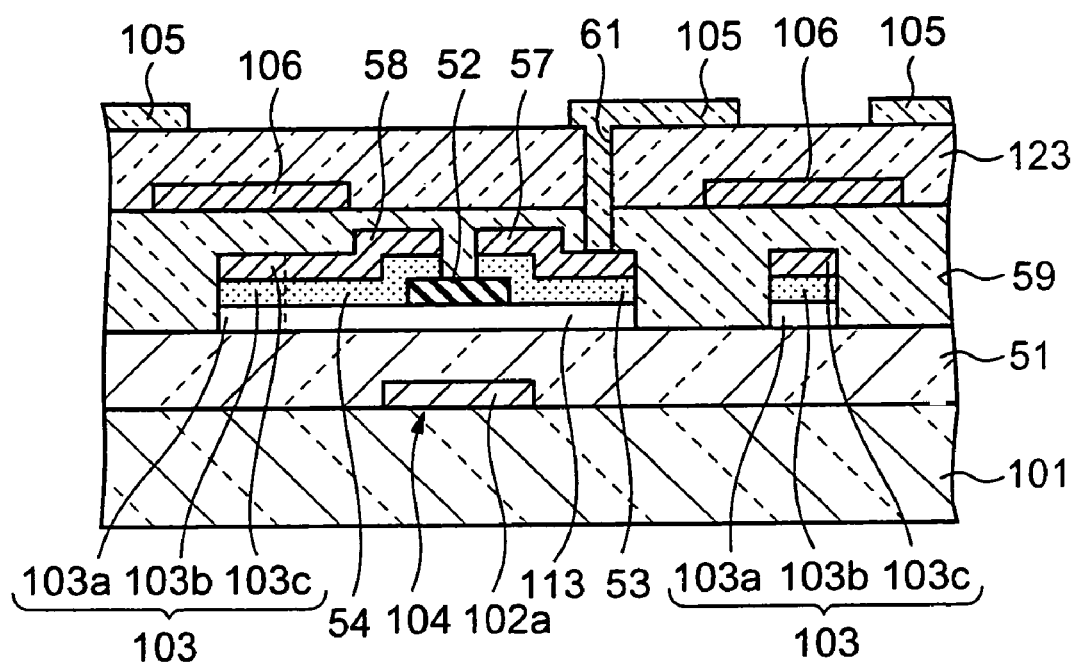
FIG. 18 is a cross-sectional view taken on the line XVIII-XVIII of FIG. 17.

Next, the specific structure of the thin film transistor panel will be explained. FIG. 18 is a cross-sectional view taken on the line XVIII-XVIII of FIG. 17. On the upper surface of the glass substrate 101, the scanning line 102 (FIG. 17) including a gate electrode 102a formed of chromium and molybdenum is formed. On the upper surfaces of the glass substrate 101, the gate electrode 102a and the scanning line 102, a gate insulating film 51 of silicon nitride is formed.

On the gate insulating film 51, a semiconductor thin film 113 made of intrinsic amorphous silicon is formed so as to cover the gate electrode 102a. On a predetermined portion of the upper surface of the semiconductor thin film 113, a channel protective film 52 made of silicon nitride is formed so as to overlap with the gate electrode 102a.

On the upper surface of the semiconductor thin film 113 and the both side portions of the upper surface of the channel protective film 52, there are formed Ohmic contact layers 53 and 54 of n-type amorphous silicon. On the upper surfaces of the Ohmic contact layers 53 and 54, there are formed a source electrode 57 and a drain electrode 58 of chromium and molybdenum, respectively.

Then, the thin film transistor 104 is formed by the gate electrode 102a, the gate insulating film 51, the semiconductor thin film 113, the channel protective film 52, the Ohmic contact layers 53 and 54, the source electrode 57 and the drain electrode 58.

On the upper surface of the gate insulating film 51, the data line 103 is formed. In this case, the data line 103 has a structure including three layers of intrinsic amorphous silicon 103a, n-type amorphous silicon 103b and a metallic layer 103c formed of chromium and molybdenum. Then, the intrinsic amorphous silicon 103a, the n-type amorphous silicon 103b and the metallic layer 103c are connected to the semiconductor thin film 113, the Ohmic contact layer 54 and the drain electrode 58, respectively.

On the upper surfaces of the gate insulating film 51, the thin film transistor 104 and the data line 103, there is formed an interlayer insulating film 59 of silicon nitride. On the upper surface of the interlayer insulating film 59, the auxiliary capacitive electrode 106 of chromium and molybdenum is formed so as to cover the data line 103.

On the upper surfaces of the interlayer insulating film 59 and the auxiliary capacitive electrode 106, an overcoat film 123 of silicon nitride is formed. A contact hole 61 is formed to the interlayer insulating film 59 and the overcoat film 123, so as to reach the source electrode 57. On the upper surface of the overcoat film 123, the pixel electrode 105 of transparent conductive material such as ITO or ZnO is formed so as to be connected to the source electrode 57 through the contact hole 61.

Then, in the active matrix type liquid crystal display device including the above-structured thin film transistor panel, the auxiliary capacitive electrode 106 having a width larger than the data line 103 are formed between the data line 103 and the pixel electrodes 105. For this reason, the auxiliary capacitive electrode 106 can prevent occurrence of coupling capacitance between the data line 103 and the pixel electrodes 105. Accordingly, this makes it possible to prevent occurrence of vertical crosstalk and achieve a high display characteristic.

Moreover, as illustrated in FIG. 17, the vicinity of each intersection of the scanning lines 102 and data lines 103 can be shielded by the auxiliary capacitive electrode 106. This makes it possible to largely increase the aperture ratio as compared with the case in which the corresponding vicinity is shielded by a black mask which is formed on the counter panel by a processing with relatively poor precision.

Moreover, as illustrated in FIG. 17, only the left and right side portions of the pixel electrode 105 are overlapped with the auxiliary capacitive electrodes 106 arranged at the right and left sides of the pixel electrode 105. This makes it possible to largely increase the aperture ratio as compared with the case in which the U-shape auxiliary capacitive electrode having two extended portions extending along the right and left side portions of the pixel electrode 105 are overlapped with three side portions of the pixel electrode 105.

Sixth Embodiment

Figure 19:
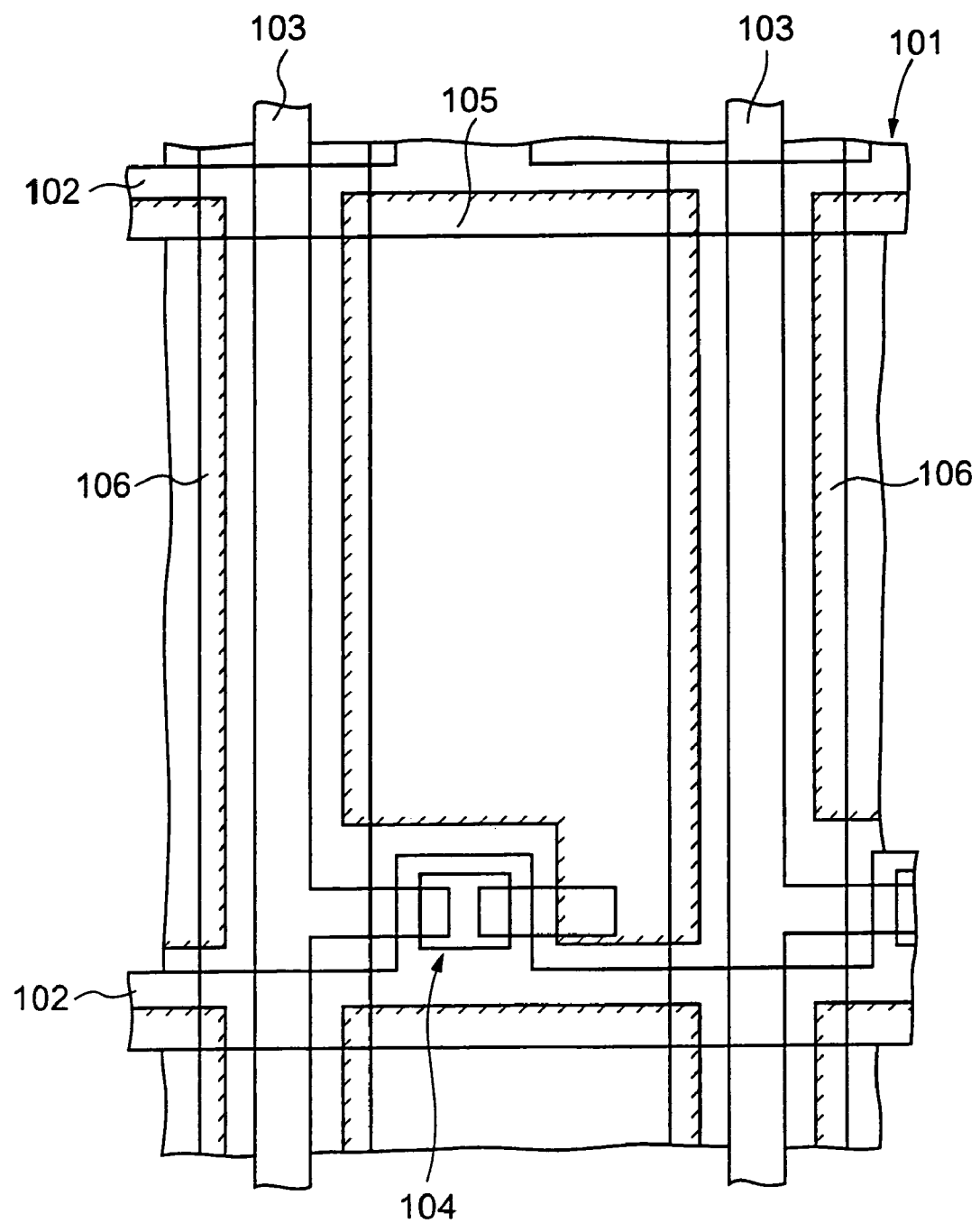
FIG. 19 is a plan view of a thin film transistor panel shown as respective layers being seen through according to a sixth embodiment of the present invention, similar to FIG. 17.

FIG. 19 is a plan view of a thin film transistor panel shown as respective layers being seen through according to a sixth embodiment of the present invention, similar to FIG. 17. In FIG. 19, the point different form the case shown in FIG. 17 is that i he upper side portion of the pixel electrode 105 is extended and overlapped with the scanning line 102. In this case, to surely prevent the upper side portion of the pixel electrode 105 from interfering with the thin film transistor (not shown) in the previous line after passing over the scanning line 102, the width of the scanning line 102 is set to be larger than the case shown in FIG. 17 to some degree.

In this way, according to the sixth embodiment, the upper side portion of the pixel electrode 105 is extended and overlapped with the scanning line 102. This eliminates a gap (light leak portion), which exists between the upper side portion of the pixel electrode 105 and the scanning line 102 as shown in FIG. 17. Accordingly, there is no need to shield the gap by a black mask provided on the counter panel and the aperture ratio can be largely increased as compared with the case of shielding by the black mask.

Moreover, since the upper side portion of the pixel electrode 105 is extended and overlapped with the scanning line 102, the electric field between the upper side portion of the pixel electrode 105 and the scanning line 102 more increases. As a result, the liquid crystal disposed between the upper side portion of the pixel electrode 105 and the counter panel is strongly restricted by off-potential of the scanning line 102 overlapping with the upper side portion of the pixel electrode 105, so that disclination lessens as compared with the case shown in FIG. 17. This makes it possible to reduce the black mask, which is formed on the counter panel to hide disclination, to some degree and increase the aperture ratio.

Seventh Embodiment

Figure 20:
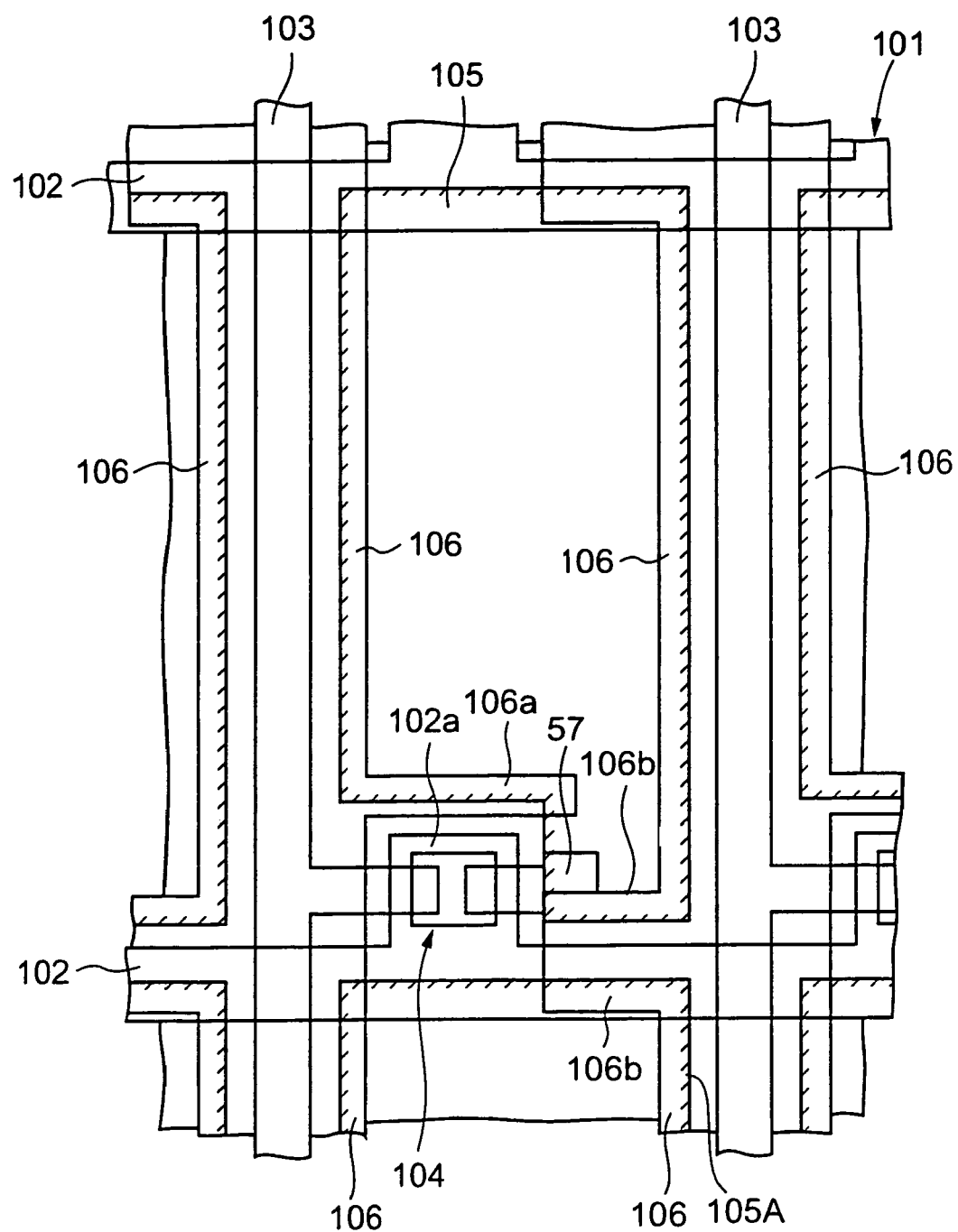
FIG. 20 is a plan view of a thin film transistor panel shown as respective layers being seen through according to a seventh embodiment of the present invention, similar to FIG. 18.

FIG. 20 is a plan view of a thin film transistor panel shown as respective layers being seen through according to a seventh embodiment of the present invention, similar to FIG. 19. In FIG. 20, the auxiliary capacitive electrode 106 placed at the left side of the pixel electrode 105 has a first extending portion 106a extending in parallel with the scanning line 102. The first extending portion 106a extends right from a portion in the vicinity of the thin film transistor 104. At the upper side of the gate electrode 102a of the thin film transistor 104, the first extending portion 106a is overlapped with the left portion of the lower side portion of the pixel electrode 105. Moreover, the auxiliary capacitive electrode 106 placed at the right side of the pixel electrode 105 has a second extending portion 106b extending in parallel with the scanning line 102. The second extending portion 106b extends left from a portion in the vicinity of the scanning line 102. The second extending portion 106b is overlapped with the right portion of the lower side portion of the pixel electrode 105, the scanning line 102, and the right portion of the upper side portion of the adjacent pixel electrode 105A. The above-explained structure is different from the structure shown in FIG. 19. In this case, a connecting portion (namely, a contact hole 61 in FIG. 18) between the source electrode 57 of the thin film transistor 104 and the pixel electrode 105 is formed at a position that avoids the second extending portion 106b.

In this way, in the seventh embodiment, the first extending portion 106a extended from the left auxiliary capacitive electrode 106 is placed between the gate electrode 102a of the thin film transistor 104 and the left portion of the lower side portion of the pixel electrode 105. Moreover, the second extending portion 106b extended from the right auxiliary capacitive electrode 106 is placed between the right portion of the lower side portion of the pixel electrode 105 and the scanning line 102. This makes it possible to reduce a coupling capacitance (Cgs) between the pixel electrode 105 and the gate electrode 102a and between the pixel electrode 105 and the scanning line 102. This means that variations in the pixel potential (field through voltage ΔV) influenced by variations of the coupling capacitance can be controlled with a small auxiliary capacitance at the time of AC drive. This enables to improve flicker that adversely affects the display quality and burning that adversely affects reliability.

Moreover, a gap between the right portion of the lower side portion of the pixel electrode 105 and the scanning line 102 is covered with the second extending portion 106b to make it possible to eliminate a light leak from the gap. Accordingly, there is no need to shield the gap by a black mask provided on the counter panel and the aperture ratio can be largely increased as compared with the case of shielding by the black mask.

Eighth Embodiment

Figure 21:
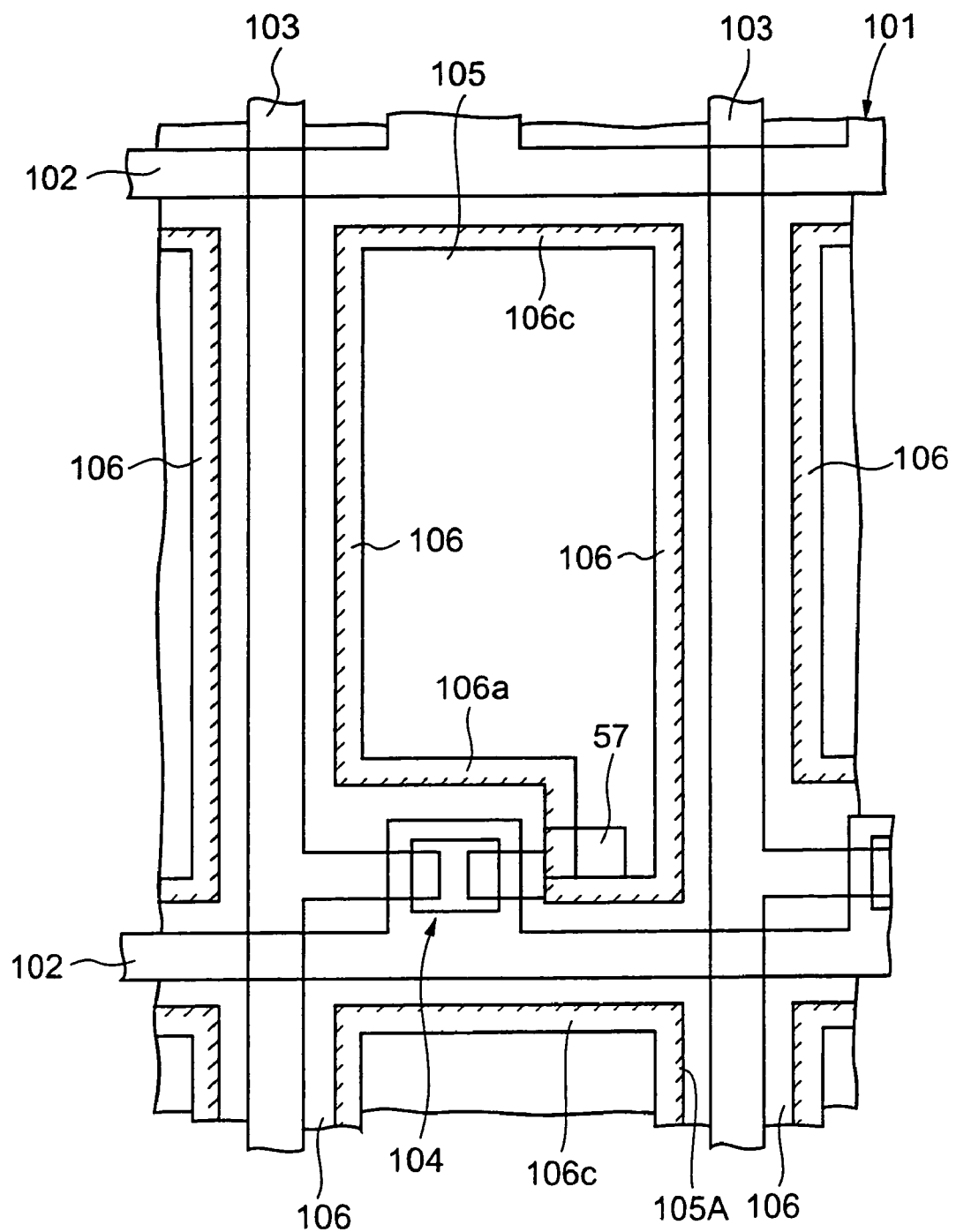
FIG. 21 is a plan view of a thin film transistor panel shown as respective layers being seen through according to an eighth embodiment of the present invention, similar to FIG. 17.

FIG. 21 is a plan view of a thin film transistor panel shown as respective layers being seen through according to an eighth embodiment of the present invention, similar to FIG. 1. In FIG. 21, the auxiliary capacitive electrodes 106 at right and left sides of the pixel electrode 105 are formed together with connecting portions 106c which are formed in the vicinity of the scanning lines 102, so as to be entirely connected with each other via the connecting portions 106c. Each connecting portion 106c is overlapped with the lower side portion of the pixel electrode. 105 and the upper side portion of the adjacent pixel electrode 105A. The above-explained structure is different from the structure shown in FIG. 17. In this case, a connecting portion (namely, the contact hole 61 in FIG. 18) between the source electrode 57 of the thin film transistor 104 and the pixel electrode 105 is formed at a position that avoids the connecting portion 106c.

In this way, in the eighth embodiment, each connecting portion 106c is overlapped with the lower side portion of the pixel electrode 105 and the upper side portion of the adjacent pixel electrode 105A. This makes it possible to cover all regions except the central portion (transparent pixel) of the pixel electrode 105 with the auxiliary capacitive electrodes 106 including the connecting portions 106c. Accordingly, there is no need to provide a black mask for preventing a light leak on the counter panel and a considerably high aperture ratio can be achieved.

Moreover, in the thin film transistor 104 having the semiconductor thin film 113 (FIG. 18) formed of intrinsic amorphous silicon, the light leak easily occurs. However, since each thin film transistor 104 (except a part of the source electrode 57) can be completely covered with the connecting portion 106c, considerably high light leak control can be obtained.

Furthermore, since the auxiliary capacitive electrodes 106 provided at right and left sides of the pixel electrode 105 are connected to each other by the connecting portions 106c, the auxiliary capacitive electrodes 106 including the connecting portions 106c are arrayed in a lattice. Accordingly, even if a break occurs anywhere in the auxiliary capacitive electrodes 106 including the connecting portions 106c, a current path can be ensured and a degree of risk that failure will occur by the break can be considerably reduced.

Moreover, in the case where the auxiliary capacitive electrodes 106 including the connecting portions 106c are arrayed in a lattice, the resistance value of the auxiliary capacitive electrodes 106 is small as compared with the case in which the auxiliary capacitive electrodes 106 are shaped stripe as illustrated in, for example, FIG. 17. This reduces a time constant, so that the liquid crystal responds quickly. In addition, though this is not illustrated, the auxiliary capacitive electrodes 106 are connected to counter electrodes formed on the opposing panel and driven in synchronization with the counter electrodes. Moreover, in order to correct jumping voltage ΔV at the time of AC drive, the counter electrodes are driven in synchronization with 1 H signal or 1V signal. For this reason, the resistance value is reduced to lessen the time constant, so that the liquid crystal responds quickly.

Ninth Embodiment

Figure 22:
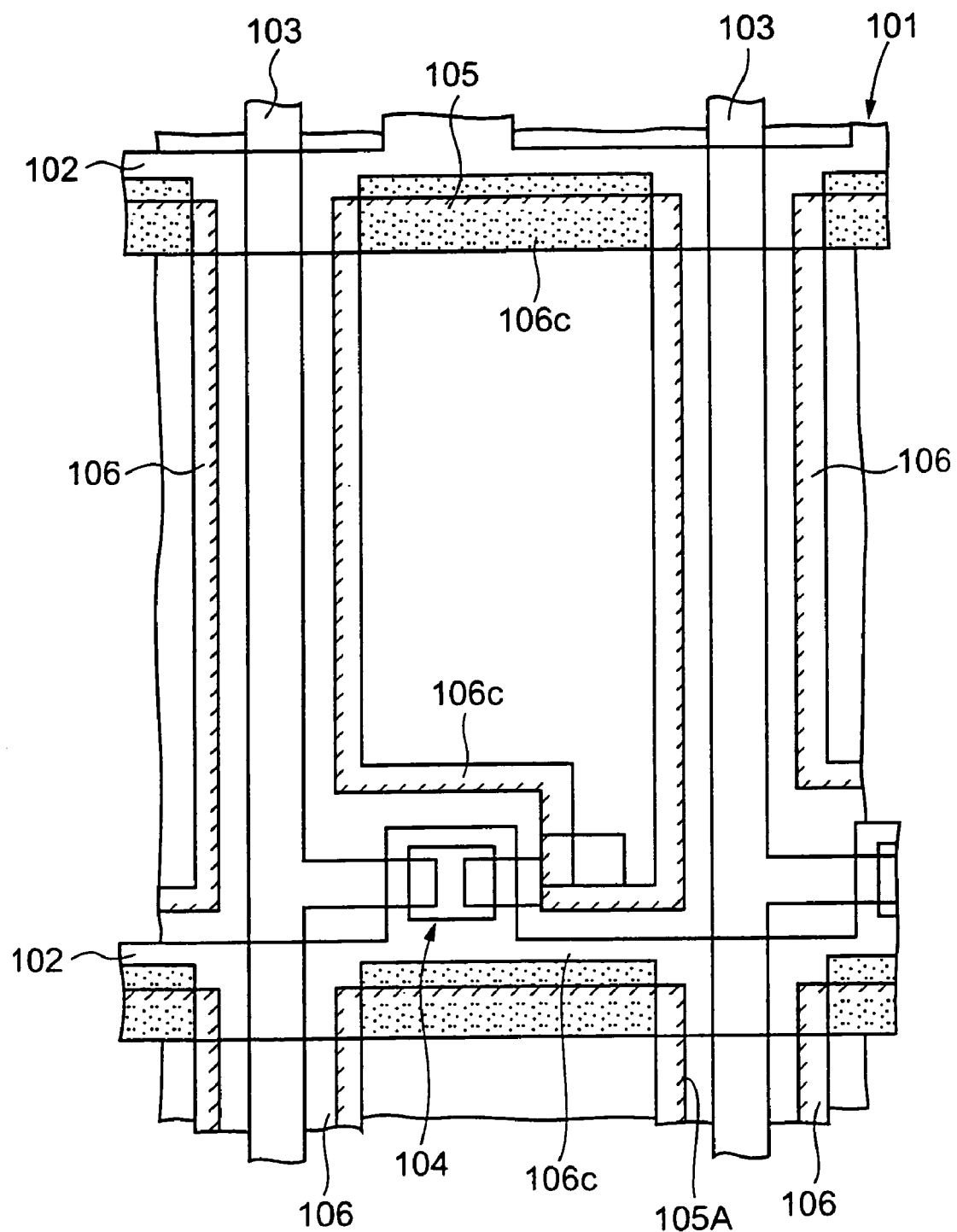
FIG. 22 is a plan view of a thin film transistor panel shown as respective layers being seen through according to a ninth embodiment of the present invention, similar to FIG 21.

FIG. 22 is a plan view of a thin film transistor panel shown as respective layers being seen through according to a ninth embodiment of the present invention, similar to FIG. 21. In FIG. 22, the point different from the case shown in FIG. 21 is that the connecting portions 106c of the auxiliary capacitive electrodes 106 are formed to be overlapped with the scanning lines 102 and not to be overlapped with the pixel electrodes 105. As a result, a part of the pixel electrode 105 directly opposes to the scanning line 102 via the insulating films. Namely, in FIG. 22, each of the connecting portions 106c of the auxiliary capacitive electrodes 106 is shaped to be overlapped with the upper portion of each scanning line 102. Moreover, in each region where dots are written, the scanning line 102 opposes to the pixel electrode 105 via the gate insulating film 51, the interlayer insulating film 59 and the overcoat film 123 (FIG. 18). Namely, in each region where the dots are written, the connecting portion 106c of the auxiliary capacitive electrodes 106 is not provided between the scanning line 102 and the pixel electrode 105.

In this way, according to the ninth embodiment, since the scanning line 102 is overlapped with only the part of the pixel electrode 105 via only the insulating films instead of the connecting portion 106c of the auxiliary capacitive electrode 106, the electric field between the pixel electrode 105 and the scanning line 102 more increases. As a result, the liquid crystal disposed between the part of the pixel electrode 105 and the counter panel is strongly restricted by off-potential of the scanning line 102 overlapping with the upper side portion of the pixel electrode 105, so that disclination lessens. This makes it possible to reduce the black mask, which is formed on the counter panel to hide disclination, to some degree and increase the aperture ratio.

Tenth Embodiment

Figure 23:
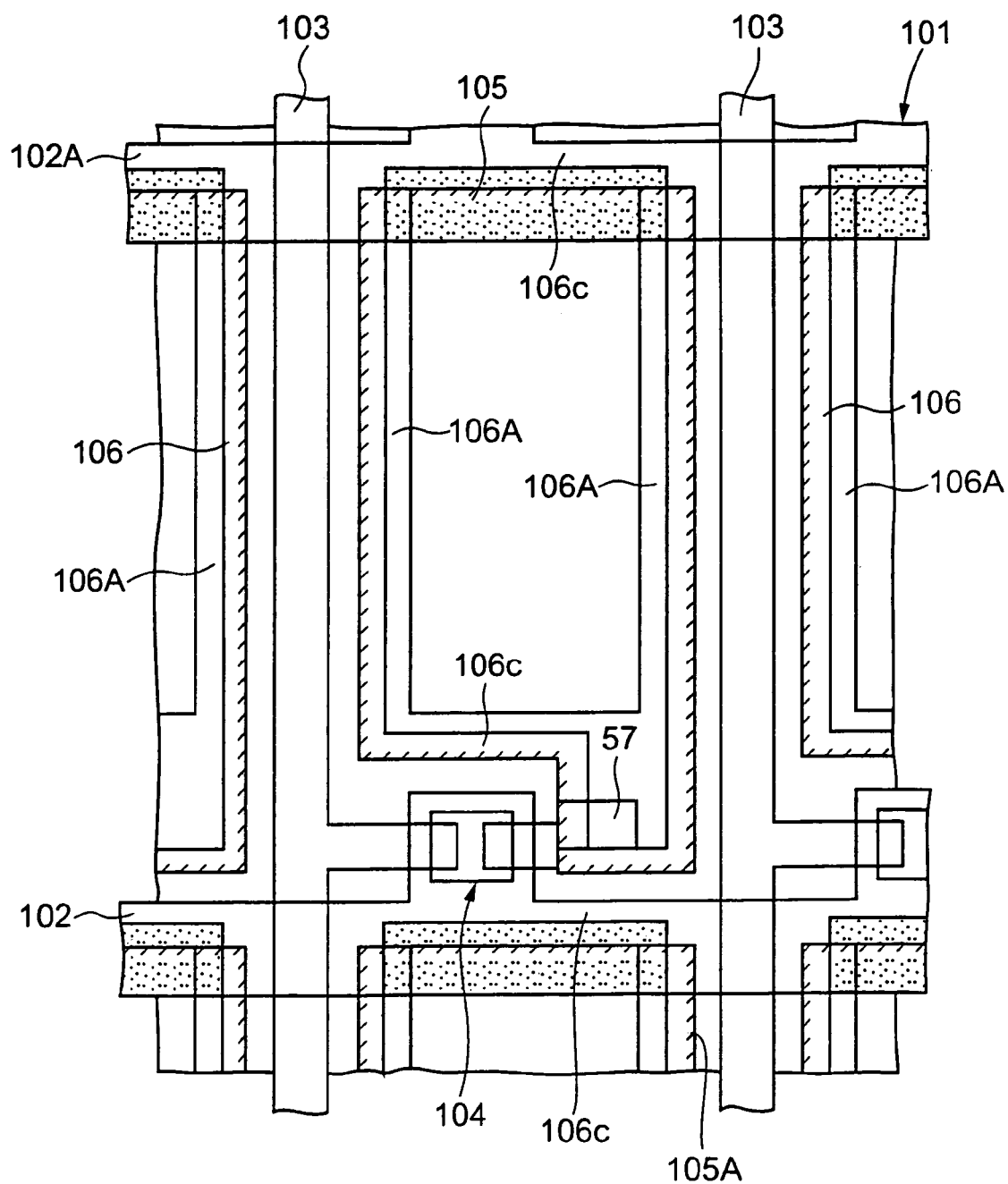
FIG. 23 is a plan view of a thin film transistor panel shown as respective layers being seen through according to a tenth embodiment of the present invention, similar to FIG. 22.
Figure 24A:
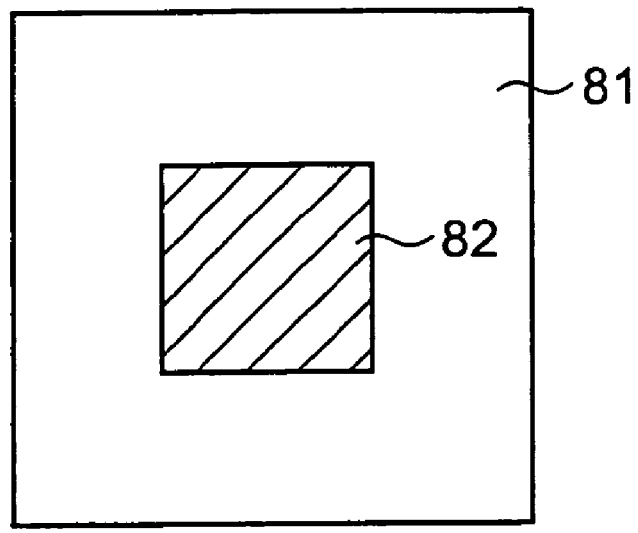
FIGS. 24A and 24B are views explaining the problem of the conventional liquid crystal display device.
Figure 24B:
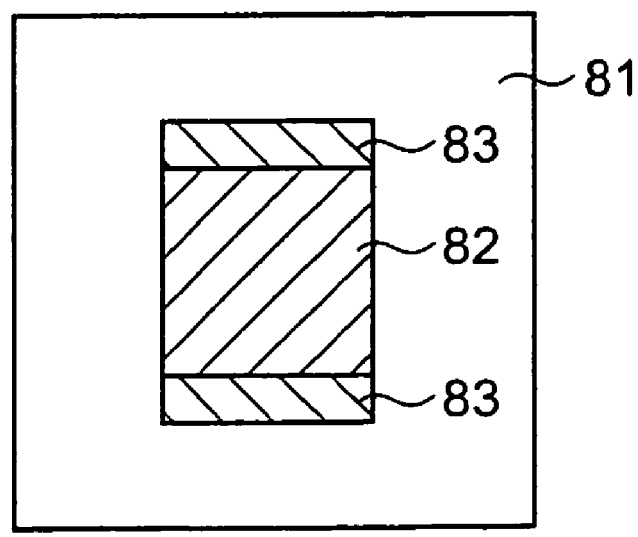

FIG. 23 is a plan view of a thin film transistor panel shown as respective layers being seen through according to a tenth embodiment of the present invention, similar to FIG. 22. In FIG. 23, the point different from the case shown in FIG. 22 is that a transparent auxiliary capacitive electrode 106A, which is formed of transparent conductive material such as ITO or ZnO, is provided as a lower conductive layer directly below each auxiliary capacitive electrode 106 which is formed on the interlayer insulating film 59 (FIG. 18) and includes the connecting portion 106c In this case, in a region corresponding to the right and left side portions and the lower side portion of the pixel electrode 105, the transparent auxiliary capacitive electrode 106A is formed up to a slightly inner position than the auxiliary capacitive electrodes 106 including the coupling portions 106c. Moreover, the transparent auxiliary capacitive electrode 106A is not formed on the connecting portion between the source electrode 57 of the thin film transistor 104 and the pixel electrode 105 (namely, contact hole 61 in FIG. 18) and the region corresponding to the vicinity thereof. Furthermore, the auxiliary capacitive electrode 106 including the connecting portions 106c is formed of shielding metal of chromium and molybdenum and the like that are electrically contactable with the transparent auxiliary capacitive electrode 106A of transparent conductive material such as ITO or ZnO.

In this way, according to the tenth embodiment, in the region corresponding to the right and left side portions and the lower side portion of the pixel electrode 105, the transparent auxiliary capacitive electrode 106A is formed up to the slightly inner position than the auxiliary capacitive electrode 106 including the coupling portions 106c. For this reason, the auxiliary capacitive portion is also formed by an overlapping portion of a part of the transparent auxiliary capacitive electrode 106A which is placed in the inner position than the auxiliary capacitive electrode 106 and the pixel electrode 105. Moreover, since the transparent auxiliary capacitive electrode 106A is formed of the transparent conductive material such as ITO or ZnO, no influence is exerted upon the aperture ratio. The size and shape of the transparent auxiliary capacitive electrode 106A are appropriately selected to make it possible to adjust the auxiliary capacitance without exerting an influence upon the aperture ratio.

In addition, with reference to FIG. 18, it can be explained that the transparent auxiliary capacitive electrode 106A may be formed on the upper surface of the interlayer insulating film 59 including the auxiliary capacitive electrode 106. Moreover, the transparent auxiliary capacitive electrode 106A may be formed on the upper surface of an upper interlayer insulating film (not shown) formed on the upper surfaces of the interlayer insulating film 59 and the auxiliary capacitive electrode 106, so that the transparent auxiliary capacitive electrode 106A is connected to the auxiliary capacitive electrode 106 through a contact hole formed to the upper interlayer insulating film. Furthermore, the transparent auxiliary capacitive electrode 106A may be formed under the upper interlayer insulating film and the auxiliary capacitive electrode 106 may be formed on the upper interlayer insulting film, so that the transparent auxiliary capacitive electrode 106A is connected to the auxiliary capacitive electrode 106 through the contact hole formed to the upper interlayer insulating film.

As explained above, according to the present invention, the part of the auxiliary capacitive electrode is formed between the pixel electrodes and the data line via the insulating films. This makes it possible to prevent occurrence of the coupling capacitance between the pixel electrodes and the data line. Accordingly, it is possible to prevent occurrence of the vertical crosstalk.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2003-61440 filed on Mar. 7, 2003 and Japanese Patent Application No. 2003-137232 filed on May 15, 2003 and including specification, claims, drawings and summary. The disclosure of the above Japanese Patent Application is incorporated herein by reference in its entirety.

What is claimed is:

1. A liquid crystal display device comprising:
a substrate;
a plurality of scanning lines formed in parallel with each other on an upper side of said substrate in one direction;
a plurality of data lines formed in parallel with each other and orthogonal to said scanning lines on said upper side of said substrate;
a thin film transistor formed in a vicinity of each intersection of said scanning lines and said data lines and having a semiconductor thin film, a gate electrode connected to one of said scanning lines, a gate insulation film disposed between said semiconductor thin film and said gate electrode, a source electrode, and a drain electrode connected to one of said data lines;
pixel electrodes each connected to the source electrode of said thin film transistor;
auxiliary capacitive electrodes each having an overlap region that overlaps with said pixel electrodes and a non-overlap region that does not overlap with said pixel electrodes and forming an auxiliary capacitance with said pixel electrodes;
a first insulating film arranged between said auxiliary capacitive electrodes and said data lines; and
a second insulating film arranged between said pixel electrodes and said auxiliary capacitive electrodes,
wherein said auxiliary capacitive electrodes include a light-shielding metal film and a transparent conductive film having a larger width than the width of said light-shielding metal film and overlapping said data line via said first insulating film.

2. The liquid crystal display device according to claim 1, wherein each of said auxiliary capacitive electrodes is of laminated construction comprising said light-shielding metal film and said transparent conductive film.

3. The liquid crystal display device according to claim 1, wherein the gate electrode and said data lines are formed on the same plane.

4. The liquid crystal display device according to claim 3, wherein said first insulating film is formed on the gate electrode and said data lines, and said scanning lines, the source electrode, the drain electrode, and said auxiliary capacitive electrodes are formed on said first insulating film.

5. The liquid crystal display device according to claim 1, wherein said gate electrode and said data lines are formed on the gate insulating film.

6. The liquid crystal display device according to claim 5, wherein the drain electrode is formed on said first insulating film, and connected to the semiconductor thin film through a contact hole formed to the gate insulating film and said first insulating film and connected to one of said data lines through a contact hole formed to said first insulating film.

7. The liquid crystal display device according to claim 5, wherein the source electrode is formed on said first insulating film, and connected to the semiconductor thin film through a contact hole formed to the gate insulating film and said first insulating film, and each of said pixel electrodes is connected to the semiconductor thin film through a contact hole formed to said second insulating film.

8. The liquid crystal display device according to claim 5, wherein the gate electrode is formed on a lower layer of each of said scanning lines.

9. The liquid crystal display device according to claim 8, wherein a width of the gate electrode is larger than a width of each of said scanning lines.

10. The liquid crystal display device according to claim 8, wherein the gate electrode comprises multiple gate electrodes which are arranged in a region of said semiconductor film corresponding to a portion between the source electrode and the drain electrode, and which are connected to each other by a common connecting portion.

11. The liquid crystal display device according to claim 8, wherein the semiconductor thin film has a U shape, and the gate electrode is formed to cross multiple portions of the U-shaped semiconductor thin film.

12. The liquid crystal display device according to claim 5, further comprising a second auxiliary capacitive electrode formed on said gate insulating film to overlap with the semiconductor thin film.

13. The liquid crystal display device according to claim 5, further comprising a second auxiliary capacitive electrode formed on said gate insulating film to overlap with the source electrode.

14. The liquid crystal display device according to claim 5, further comprising a second auxiliary capacitive electrode formed on said gate insulating film to overlap with the semiconductor thin film and the source electrode.

15. The liquid crystal display device according to claim 14, wherein said second insulating film is formed of resin.

16. The liquid crystal display device according to claim 1, wherein part of each of said pixel electrodes is overlapped with said scanning lines adjacent to each of said pixel electrodes.

17. The liquid crystal display device according to claim 1, wherein said semiconductor thin film and said data lines are formed on the gate insulating film,
the source electrode and the drain electrode are formed to be laminated on said semiconductor thin film, and
said first insulating film is formed on said data lines, the source electrode, the drain electrode, and on the gate insulating film.

18. The liquid crystal display device according to claim 1, wherein an extending portion that is at least partly overlapped with a gap between each of said pixel electrodes and the gate electrode of said thin film transistor is extended from each of said auxiliary capacitive electrodes.

19. The liquid crystal display device according to claim 1, wherein an extending portion that is overlapped with a gap between each of said pixel electrodes and each of said scanning lines is extended from each of said auxiliary capacitive electrodes.

20. The liquid crystal display device according to claim 1, wherein a connecting portion is formed between said auxiliary capacitive electrodes adjacent to each other, and said auxiliary capacitive electrodes are arrayed in a lattice as a whole.

21. The liquid crystal display device according to claim 20, wherein said connecting portion is formed in a region including a gap between each of said pixel electrodes and each of said scanning lines and a region corresponding to an entirety of one of said scanning lines.

22. The liquid crystal display device according to claim 21, wherein said connecting portion is overlapped with the semiconductor thin film of said thin film transistor.

23. The liquid crystal display device according to claim 20, wherein a first part of each of said scanning lines is overlapped with the connecting portion of said auxiliary capacitive electrodes and a second part is overlapped with an adjacent pixel electrode instead of being overlapped with the connecting portion.

24. The liquid crystal display device according to claim 1, wherein each of said pixel electrodes is connected to the source electrode via the contact hole of said first insulating film and said second insulating film.

* * * * *